(12) United States Patent
van Wingerden

(10) Patent No.: US 11,068,982 B2
(45) Date of Patent: Jul. 20, 2021

(54) SYSTEMS AND METHODS TO SECURELY MATCH ORDERS BY DISTRIBUTING DATA AND PROCESSING ACROSS MULTIPLE SEGREGATED COMPUTATION NODES

(71) Applicant: Tora Holdings, Inc., Burlingame, CA (US)

(72) Inventor: Gerrit Bruce van Wingerden, Hong Kong (CN)

(73) Assignee: Tora Holdings, Inc., Burlingame, CA (US)

(*) Notice: Subject to any disclaimer, the term of this patent is extended or adjusted under 35 U.S.C. 154(b) by 16 days.

(21) Appl. No.: 15/924,069

(22) Filed: Mar. 16, 2018

(65) Prior Publication Data

US 2018/0276661 A1 Sep. 27, 2018

Related U.S. Application Data

(60) Provisional application No. 62/474,550, filed on Mar. 21, 2017, provisional application No. 62/480,982, (Continued)

(51) Int. Cl.
G06Q 20/38 (2012.01)
G06Q 40/04 (2012.01)

(52) U.S. Cl.
CPC .......... *G06Q 40/04* (2013.01); *G06Q 20/383* (2013.01); *G06Q 20/3823* (2013.01); *G06Q 20/3827* (2013.01); *G06Q 20/3829* (2013.01)

(58) Field of Classification Search
None
See application file for complete search history.

(56) References Cited

U.S. PATENT DOCUMENTS 4,287,508 A * 9/1981 Arita .................. H04Q 9/14
340/4.21
5,471,411 A * 11/1995 Adams ............... H03H 17/0628
708/300

(Continued)

FOREIGN PATENT DOCUMENTS

EP 1386215 A2 2/2004
WO WO2018175262 A1 9/2018

OTHER PUBLICATIONS

A Web-Based Financial Trading System (Year: 1999).*

(Continued)

*Primary Examiner* — Mamon Obeid
(74) *Attorney, Agent, or Firm* — Carr & Ferrell LLP

(57) ABSTRACT

Systems and methods to securely match orders by distributing data and processing across multiple segregated computation nodes are disclosed herein. An example method includes separating orders into shares using a secret sharing schema by breaking down the orders into bitwise representations having order attributes, creating order messages for one or more of a plurality of entities, each of the orders having an unencrypted identifier that uniquely identifies an entity and at least a portion of the shares for that entity, digitally signing the order messages with public keys, distributing the order messages to a plurality of non-overlapping independent processing nodes, wherein the plurality of non-overlapping independent processing nodes compare attributes of the received order messages to find matching order messages, calculating a secure price match and quantity and creating an encrypted package that comprises the secure price match and quantity, and transmitting the encrypted package for transaction completion.

19 Claims, 13 Drawing Sheets

Related U.S. Application Data filed on Apr. 3, 2017, provisional application No. 62/563,586, filed on Sep. 26, 2017.

(56) References Cited

U.S. PATENT DOCUMENTS

| | | | | |
|---|---|---|---|---|
| 5,555,393 | A * | 9/1996 | Tanaka | G06F 12/126 711/133 |
| 6,061,789 | A * | 5/2000 | Hauser | G06F 21/606 380/255 |
| 6,236,972 | B1 * | 5/2001 | Shkedy | G06Q 10/087 705/26.1 |
| 6,278,982 | B1 * | 8/2001 | Korhammer | G06Q 40/04 705/36 R |
| 6,363,365 | B1 * | 3/2002 | Kou | G06Q 20/0855 705/26.3 |
| 6,480,605 | B1 * | 11/2002 | Uchiyama | H04L 9/3013 380/259 |
| 6,882,985 | B1 * | 4/2005 | Kay | G06Q 30/0283 705/1.1 |
| 6,938,019 | B1 * | 8/2005 | Uzo | G06Q 20/06 380/268 |
| 7,117,250 | B1 * | 10/2006 | Wu | G06F 21/10 709/217 |
| 7,181,017 | B1 * | 2/2007 | Nagel | H04L 9/0825 380/282 |
| 7,187,772 | B2 * | 3/2007 | Vora | G06Q 20/00 380/277 |
| 7,233,662 | B2 * | 6/2007 | Futa | H04L 9/3093 380/28 |
| 7,383,220 | B1 * | 6/2008 | Keith | G06Q 40/04 705/37 |
| 7,490,069 | B2 * | 2/2009 | Camenisch | G06Q 20/02 705/74 |
| 7,689,495 | B1 * | 3/2010 | Kim | G06Q 40/00 705/37 |
| 7,835,978 | B2 * | 11/2010 | Camenisch | G06Q 20/383 705/37 |
| 9,430,655 | B1 * | 8/2016 | Stockton | H04L 9/3066 |
| 9,503,123 | B1 * | 11/2016 | Pinho | H03M 7/30 |
| 9,917,820 | B1 * | 3/2018 | Kolman | G06F 21/6227 |
| 10,438,242 | B1 * | 10/2019 | Carr | H04L 63/08 |
| 2001/0044770 | A1 * | 11/2001 | Keith | G06Q 40/04 705/37 |
| 2002/0165817 | A1 * | 11/2002 | Rackson | G06Q 40/10 705/37 |
| 2003/0177126 | A1 * | 9/2003 | Weingard | G06Q 40/04 |
| 2004/0117649 | A1 * | 6/2004 | Whyte | H04L 9/0891 380/286 |
| 2005/0125329 | A1 * | 6/2005 | Gerhart | G06Q 40/04 705/37 |
| 2005/0240510 | A1 * | 10/2005 | Schweickert | G06Q 40/04 705/37 |
| 2005/0268103 | A1 * | 12/2005 | Camenisch | G06Q 30/04 713/176 |
| 2006/0101207 | A1 * | 5/2006 | Nakazato | G06F 12/0851 711/131 |
| 2007/0107039 | A1 * | 5/2007 | Miyakawa | H04N 5/765 725/142 |
| 2007/0150408 | A1 * | 6/2007 | Camenisch | G06Q 30/08 705/37 |
| 2007/0223706 | A1 * | 9/2007 | Gantman | H04L 9/085 380/286 |
| 2008/0016177 | A1 * | 1/2008 | Jin | G06F 16/951 709/217 |
| 2008/0082817 | A1 * | 4/2008 | Takahashi | G06F 21/31 713/155 |
| 2008/0232580 | A1 * | 9/2008 | Hosaka | H04L 9/085 380/28 |
| 2008/0306864 | A1 * | 12/2008 | Foley | G06Q 20/383 705/37 |
| 2009/0012874 | A1 * | 1/2009 | Case | G06Q 30/0617 705/26.42 |
| 2009/0144543 | A1 * | 6/2009 | Fujii | H04L 9/085 713/160 |
| 2010/0174654 | A1 * | 7/2010 | Foley | G06Q 50/188 705/80 |
| 2010/0293015 | A1 * | 11/2010 | Coglianese | G06Q 40/04 705/7.29 |
| 2011/0022883 | A1 * | 1/2011 | Hansen | G06F 11/2035 714/2 |
| 2011/0078065 | A1 * | 3/2011 | Wingerden | G06Q 40/04 705/37 |
| 2011/0126291 | A1 * | 5/2011 | Araki | H04L 9/085 726/26 |
| 2011/0202415 | A1 * | 8/2011 | Casares | G06Q 20/20 705/17 |
| 2012/0005438 | A1 * | 1/2012 | Miyazaki | G06F 12/06 711/157 |
| 2012/0084562 | A1 * | 4/2012 | Farina | H04L 63/12 713/168 |
| 2012/0131312 | A1 * | 5/2012 | Seal | G06F 9/30032 712/208 |
| 2012/0163592 | A1 * | 6/2012 | Bellare | H04L 9/14 380/44 |
| 2012/0221854 | A1 * | 8/2012 | Orsini | H04L 9/3226 713/167 |
| 2013/0238481 | A1 * | 9/2013 | Smith | G06Q 40/04 705/37 |
| 2013/0282564 | A1 * | 10/2013 | Sibbald | H04L 67/06 705/39 |
| 2014/0250018 | A1 * | 9/2014 | Phillips | G06Q 20/4012 705/72 |
| 2015/0188881 | A1 * | 7/2015 | Bergman | H04L 67/02 709/218 |
| 2016/0019540 | A1 * | 1/2016 | Tsutsui | G06Q 20/401 705/71 |
| 2016/0072803 | A1 * | 3/2016 | Holz | H04W 12/06 726/7 |
| 2016/0203557 | A1 * | 7/2016 | Pabrai | G06Q 40/06 705/37 |
| 2016/0379005 | A1 * | 12/2016 | O'Hare | H04L 67/1097 713/164 |
| 2020/0151222 | A1 * | 5/2020 | Mannar | G06K 9/4628 |
| 2020/0272348 | A1 * | 8/2020 | Arnold | G06F 16/1748 |

OTHER PUBLICATIONS

Damgård I., Fitzi M., Kiltz E., Nielsen J.B., Toft T., "Unconditionally Secure Constant-Rounds Multi-party Computation for Equality, Comparison, Bits and Exponentiation." In: Halevi S., Rabin T. (eds) Theory of Cryptography. TCC 2006. Lecture Notes in Computer Science, vol. 3876. Springer, Berlin, Heidelberg, 2006, 20 pages.

Nishide T., Ohta K., "Multiparty Computation for Interval, Equality, and Comparison Without Bit-Decomposition Protocol." In: Okamoto T., Wang X. (eds) Public Key Cryptography—PKC 2007. PKC 2007. Lecture Notes in Computer Science, vol. 4450. Springer, Berlin, Heidelberg, 2007, 19 pages.

"International Search Report" and "Written Opinion of the International Searching Authority," Patent Cooperation Treaty Application No. PCT/US2018/023010, dated May 24, 2018, 7 pages.

"Extended European Search Report," European Patent Application No. EP18772550.2, dated Apr. 19, 2021.

* cited by examiner

SYSTEMS AND METHODS TO SECURELY MATCH ORDERS BY DISTRIBUTING DATA AND PROCESSING ACROSS MULTIPLE SEGREGATED COMPUTATION NODES

CROSS REFERENCE TO RELATED APPLICATIONS

This application claims the benefit and priority of U.S. Provisional Patent Application Ser. No. 62/474,550 filed on Mar. 21, 2017 and titled "Intelligent Networked Architecture," this application also claims the benefit and priority of U.S. Provisional Patent Application Ser. No. 62/480,982 filed on Apr. 3, 2017 and titled "Description of an Invention to Securely Match Orders by Distributing Data and Processing Across Multiple Segregated Computation Nodes," and this application claims the benefit and priority of U.S. Provisional Patent Application Ser. No. 62/563,586 filed on Sep. 26, 2017 and titled "Description of Systems and Methods to Securely Match Orders by Distributing Data and Processing Across Multiple Segregated Computation Nodes," all disclosures of which are hereby incorporated by reference herein in their entirety, including all references and appendices cited therein.

FIELD OF THE PRESENT TECHNOLOGY

The present technology relates generally to distributed computing, and more specifically, but not by limitation, to systems and methods that securely match orders by distributing data and processing across multiple segregated computation nodes.

SUMMARY

Various embodiments of the present technology include a method comprising: separating orders into shares using a secret sharing schema by breaking down the orders into bitwise representations comprising order attributes; encrypting the shares; creating order messages for one or more of a plurality of entities, each of the orders comprising an unencrypted identifier that uniquely identifies an entity and at least a portion of the shares for that entity; for each of the one or more of a plurality of entities, digitally signing the order messages with public keys; distributing the order messages to a plurality of non-overlapping independent processing nodes; wherein the plurality of non-overlapping independent processing nodes compare attributes of the received order messages to find matching order messages; calculating a secure price match and quantity and creating an encrypted package that comprises the secure price match and quantity; and transmitting the encrypted package for transaction completion.

Various embodiments of the present technology include a system comprising: a matching engine that creates order messages for one or more of a plurality of entities, each of the orders comprising an unencrypted identifier that uniquely identifies an entity and at least a portion of order shares for that entity, the order shares comprising bitwise representations comprising order attributes; and plurality of non-overlapping independent processing nodes coupled through a message bus, wherein each of the plurality of non-overlapping independent processing nodes are configured to: receive encrypted order shares in order messages; compare attributes of the received order messages to find matching order messages; calculate a secure price match and quantity and creating an encrypted package that comprises the secure price match and quantity; and transmit the encrypted package for transaction completion, wherein all share-level operations of the order messages are authenticated by each of the plurality of non-overlapping independent processing nodes to prevent unauthorized access to the order messages.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
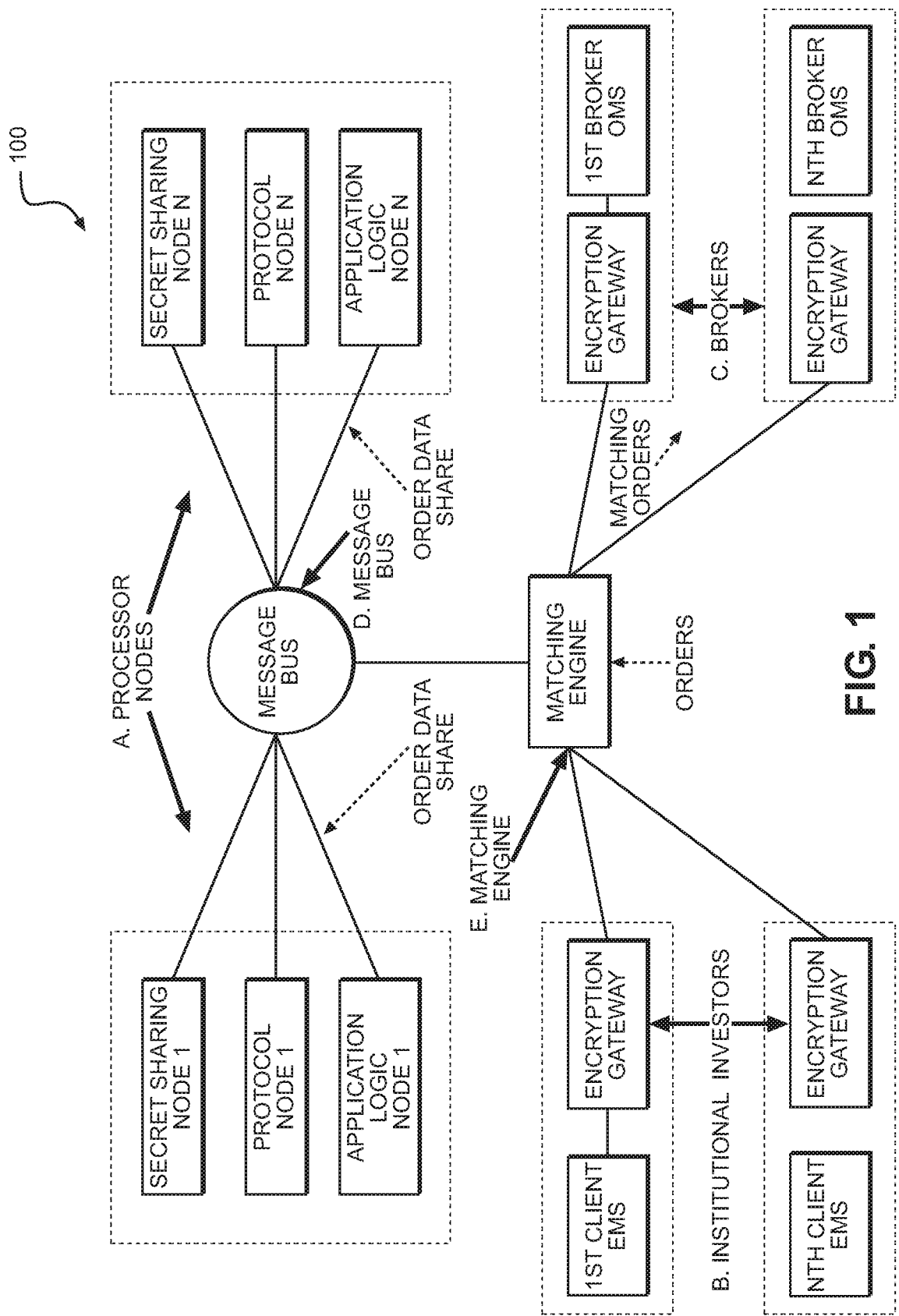
FIG. 1 is a schematic diagram of an example system of the present disclosure.

The present disclosure is directed to various embodiments of systems and methods that securely match orders by distributing data and processing across multiple segregated computation nodes.

For context, it will be understood that order information leakage is a perennial source of concern for institutional investors. It can influence the behavior of both human and machine market participants in a way that adversely impacts prices, resulting in increased slippage and eroded investment returns, leading investors to take various steps to reduce information leakage.

Trading algorithms can disguise a true size and price of large orders by breaking them into smaller orders which are exposed to the market in line with parameters specified by traders. Leveraging the services of agency trading desks to find a match for large orders is another option. Agency desks see the order flow from many different firms and thus may be able to identify institutions that would be willing to trade the opposite side of a large order off-exchange at a price that would be much more favorable than one could expect to achieve by executing it in the market.

Some solutions send orders to a dark pool where they can be matched automatically without human involvement by a machine.

Unfortunately for institutional investors, all of these approaches suffer from the same fundamental problem that they require investors to expose their order flow to one or more third parties who may either intentionally or unintentionally leak the information or act upon it. These are critical technical problems faced in the age of digital investing.

The present disclosure provides technical solutions to these and other technical problems by providing systems and methods that utilize the efficiency and security of distributed computing, as well as other computing improvements to allow for fulfillment of trading orders. These methods and systems facilitate data exchange between institutional investors and brokers through use of a matching engine that distributes orders to distributed processor nodes. In more detail, investors can break up orders into sections, which are encrypted. Methods for breaking these orders down can include various secret sharing algorithms.

In some embodiments, a broker list (trusted brokers selected by the investor) is then broken up into segments/sections and encrypted. A package of encrypted order sections and encrypted broker list sections are then pushed to the matching engine. The matching engine then distributes portions of the packages created by the investors to various distributed processor nodes. The processor nodes are provided with decrypting schemas that allow the processor nodes to decrypt parts of the order messages (those portions for which they have a decryption key), while the remainder remains encrypted and inaccessible. Other nodes have the ability to decrypt the remainder so that all of the order messages are fully decrypted across a plurality of the processor nodes.

In some embodiments, the processor nodes will cross communicate with one another through a message bus (or through other means) and compare their decrypted order sections to other another to locate overlapping decrypted order sections. When a match is found, a broker is selected from the broker list at random or based on weighting associated with each of the brokers (which could be based on investor preferences). This comparison can be executed using bitwise sharing, where secure comparison of two secrets can be facilitated.

In a second process, a shared match price and quantity are calculated. This data forms the basis for a second message that is delivered to the selected broker.

The processor nodes push the order sections and selected broker information back to the matching engine in another encrypted message. The second message comprising the shared match price and quantity are also transmitted to the selected broker in an encrypted state.

The price match and quantity are decrypted, in some embodiments, at the investor computing device, which implements an encryption gateway. The investor is also informed as to the matched or selected broker entity for the share transaction.

In other words, the matching engine routes the matched parts of the order messages to the broker(s) identified in the broker list sections. The brokers then decrypt the two messages received from the matching engine and process the resultant orders. Thus, the methodology described provides for end-to-end use of encryption. That is, prior to transmission of data at any given step in the process, the transmitting entity will encrypt data to be transmitted from the order messages created by the investor, to the matches located by the processor nodes that are pushed back to the broker systems, as well as the acknowledgement or fulfillment messages that are transmitted either directly back to the investor or are routed through the processor nodes in such a way that the processor nodes can update the status/states of the order messages originally received from the investor systems.

The present disclosure describes systems and methods that allow institutional investors to trade stocks with each other over a distributed network in a way that provides an unprecedented level of privacy and anonymity by distributing order data and application logic across multiple, independent nodes operated by distinct organizations. This ensures that it is impossible for any one organization or individual to see another firm's orders. These systems and methods also allow institutional investors to specify a list of brokers they would be willing to use to execute their order and only exposing the orders to those brokers after a match has been found. These processes are in opposition to existing workflows that require investors to send their flow to a specific broker for matching (or execution in an algorithm or dark pool) before it matches which gives the broker a view onto the entirety of those investor's unexecuted flow including limit prices and full quantities. These and other advantages of the present disclosure are illustrated in the collective drawings and are described below.

FIG. 1 illustrates an example system 100 performing an example workflow of the present disclosure. In general, the system 100 comprises one or more processor nodes A, one or more institutional investor systems B, broker systems C, a message bus D, and a matching engine E.

In some embodiments, institutional investors systems B are configured to break the attributes of their orders into n shares using a secret sharing scheme and encrypt each share using the public key of a corresponding processor node (a). In some embodiments, this includes the institutional investor systems breaking orders into bitwise representations of their respective attributes. Individual bits are broken into shares in some embodiments. To be sure, a share as disclosed herein is a component part of a larger order.

In some embodiments, shares are encrypted with a symmetric encryption scheme and the public key is used to encrypt the symmetric key, which is then transmitted along with the cipher text of the encrypted shares. Some embodiments use AES with Galois/Counter Mode to perform the symmetric encryption and Optimal Asymmetric Encryption Padding (OAEP) with RSA to encrypt the AES key. However, these could be replaced with any equally secure encryption scheme without impacting the security of the systems and methods disclosed herein.

In some embodiments, the institutional investor systems B create a broker list that specifies with which broker systems C they would be willing to trade their orders and break the list into n shares and encrypt each share with the public key of a corresponding processor node. It will be understood that Institutional Investors who are interested in trading directly with other could easily be able to do by extending the broker list to include specific institutional investors and their systems.

In some embodiments, encrypted shares of the broker list and order attributes are packaged up into order messages that also contain an unencrypted identifier that identifies a discrete institutional investor system. In various embodiments, each order message is digitally signed with the public key of the institutional investor, by the institutional investor system B and the signature is added to the message. The institutional investor system B sends order messages to the matching engine E over a network connection.

In various embodiments, the matching engine E routes each order message to one of the processor nodes A via a message bus D. In some embodiments, processors nodes A are intended to be operated independently of one another by separate corporate entities with non-overlapping information technology (IT) infrastructure and staff so that if the security of one entity is compromised, it does not impact the security of processor nodes operated by other entities.

Upon validating the signature of an order message against the public key of the institutional investor by the processor node(s) A, the processor node(s) A decrypt the shares of each order attribute. Because the underlying data has been broken into n shares, the unencrypted data visible to any given node provides no information about the order itself. In other words, an adversary that has compromised a single processing node or a curious employee at a processor node operator with access to the data of a processor node has no visibility on to order data. Furthermore, even if adversaries were to gain visibility on to share data of more than one processor node they would gain no information about the order provided that the number of processor nodes on to which they had visibility was fewer than (n+1)/2.

The processor nodes A communicate with each other to compare the attributes of the order with other orders to find a matching order that also has at least one overlapping broker in the broker list. In some embodiments, the share/order matching process may take other criteria into account such as time-priority whereby orders that come into the system earlier have priority over those that come in later.

In some instances, communication is performed over secure point-to-point channels provided by the message bus D. Comparison is performed using protocols built on top of low-level operations on the shares. The protocols used for comparison are secure and reveal no information about an order to an adversary with visibility of fewer than (n+1)/2 shares other than whether or not that order matched with another order or not.

Once a matching order is found by the processor nodes A, the overlap of both orders' broker list is computed and one is chosen at random. The selection process does not necessarily need to be completely random. For example, it could be one that weights brokers with different probabilities or priorities brokers according to client preferences.

A shared match price and quantity are securely computed in some embodiments, but the matching engine E. The secret shares for the order attributes for the two matching orders and the secure match price and quantity are encrypted using the public key of the chosen broker by each processor node A and sent to the matching engine E.

A security scheme that will be described in detail below ensures that every protocol processor (e.g., processor node) authenticates share-level operations before they can be performed. This ensures that an adversary who gains control of one processor node is restricted from performing operations on shares that could result in order data being revealed in a manner that is inconsistent with the application logic.

The matching engine E packages the data for each order into two order messages which it sends to a selected broker system C over a network connection. The broker system C decrypts the contents of each order message with its private key and reassembles the shares to construct a fix order message for each order. This reconstructed order is then sent to the broker systems order management service. In some embodiments, an order can be sent as a worked order in which case it will be manually matched by a sales trader or as an algorithmic order in which case it will be matched automatically.

After performing any necessary compliance checks and reporting requirements, the broker system C matches the orders and issues an acknowledgement to the matching engine. At this point the institutional investor system orders have successfully matched and the broker system will be the counterparty for each of the orders. In some embodiments, the workflow could be more complicated than an acknowledgement. For example, it's conceivable the broker system may only be able to match a portion of the order or return a final match price after the market close in the event that orders are being matched at VWAP.

In some embodiments, the matching engine E transmits a message to the processor nodes A indicating that the orders have matched. The processor nodes A securely update the order internal state and return copies of shares for the match quantity and price encrypted with the public keys of the institutional investors who own the orders. The matching engine E sends an order acknowledgement to each of the institutional investor systems B that comprises the encrypted shares for the match price and quantity along with the identifier of the broker system C (e.g., identifies the selected broker associated with the broker system).

Shares of the match price and quantity are decrypted at an encryption gateway running at the institutional investor system B side using each institutional investor system's private key and a fix execution report message is created and sent to the institutional investor system's internal order management system (not illustrated).

The institutional investor systems B have securely matched their orders having revealed only minimal information about them as summarized by the following table:

| Time frame | Actor | What do They See? |
|---|---|---|
| Sent but Not Matched | Broker | No information |
| Sent but Not Matched | Actor with full visibility of all node data in a particular node. | That an Institutional Investor has placed an order. Order details are not visible. |
| Sent but Not Matched | Actor with full visibility on the state of the Matching Engine. | That an Institutional Investor has Placed an order. Order details are not visible. |
| Matched | Broker | All details of the match. Original order quantity and limit price are not visible. |
| Matched | Actor will full visibility on all node data in a particular node. | That two Institutional Investors have traded with each other using a particular broker. No order details are available other than the set of overlapping specified Brokers. |

Additional aspects and embodiments of order data comparison and secret sharing are disclosed as follows. These processes can be executed individually or cooperatively between the processor nodes A and the matching engine E. Order data is hidden by the processor nodes A using a secret sharing scheme which breaks units of data known as the "secret" into smaller units of data known as "shares," which by themselves reveal no data about the "secret."

The systems and methods disclosed herein, in some embodiments, use a polynomial sharing scheme known as Shamir Secret Sharing. In Shamir Secret Sharing, elements of a finite field are broken into N+1 or more points of an N order polynomial. In some embodiments of the systems and methods the field is the set of integers MOD P where P is a prime number. This sharing has several important characteristics. Namely, a party with N or fewer points gains no information about the secret. A party with N+1 or more points can reconstruct the secret. It is possible for parties holding shares of two secrets to perform addition or multiplication modulo P on them in a way such that no information about the secrets or the result is leaked. The output of these operations will be a new secret sharing. It is possible for parties holding a sharing of a secret to securely multiply it by a constant modulo P. It is possible for N+1 or more parties to collectively and securely generate a random secret.

Other sharing schemes, such as a replicated secret sharing scheme, which possesses similar properties as the Shamir scheme in that more than (N+1)/2 parties are required to reconstruct the secret. Also, the same low level operations are performed securely (i.e. addition, multiplication by known constant, and multiplication). Other similar sharing schemes that are known to one of ordinary skill in the art may also be used in accordance with the present disclosure.

Given the ability to perform addition, multiplication, and scalar multiplication on shared secrets combined with the ability to randomly generate shared secrets one can securely decompose the sharing of a secret into a sharing of bits using algorithms that would be known to one of ordinary skill in the art.

Furthermore, given bitwise sharings of two secrets it is possible to securely compare whether or not two secrets are equal to one another or whether one secret is greater than another using the basic operations of addition, multiplication, and scalar multiplication by following algorithms that would be known to one of ordinary skill in the art with the present disclosure before them.

It will be appreciated that the term "secure" or "securely" means that a party with visibility onto the computations performed by N or fewer nodes while executing the algorithms gains no information about the underlying or resulting secrets.

The following descriptions provide an example use case that involves implementing a secure comparison function on top of secret multiplication, addition, and scalar multiplication.

The following terms are provided for clarity: $[xxx]_p$ denotes a polynomial secret sharing where $xxx \in Z_p$ and $Z_p$ is a prime field containing the numbers 1 to p−1; $[xxx]_{B_l}$ denotes a bitwise secret sharing of xxx with l bits and $[xxx_i]_{B_l}$ represents the ith most significant bit of that sharing. For example, $[7]_{B_4}$ would be $\{[0]_p, [1]_p, [1]_p, [1]_p\}$.

The example provided below describes secure comparison of two secrets. Some embodiments include systems that use addition, multiplication, and multiplication by a scalar to build a function xor which takes as input the sharing of two bits $[a]_p$ and $[b]_p$ where a and b∈{0, 1} and securely computes the xor of the bits.

This function can be implemented as:

$$xor([a]_p,[b]_p) = [a]_p + [b]_p - 2[a]_p[b]_p$$

Where xor can then be used to implement a secure function compare($[a]_{B_l}, [b]_{B_l}$)→$[g]_p$ where g is 1 if a=b and 0 if a≠b as follows:

---
compare($[a]_{B_l},[b]_{B_l}$)
---
$[f_0]_p \leftarrow [1]_p$
for i = 1 to l
  $[c_i]_p \leftarrow$ xor($[a_i]_{B_l}, [b_i]_{B_l}$)

---
compare($[a]_{B_l},[b]_{B_l}$)
---
  $[d_i]_p \leftarrow [1]_p - [c_i]_p$
  $[f_i]_p \leftarrow [d_i]_p[f_{i-1}]_p$
$[g]_p \leftarrow [f_l]_p$ It will be understood that each $c_i$ will be 0 if the ith bit of a and b match and 1 and if a match does not exist it means that $d_i$ will be 1 if the ith bit of a and b match and 0 if a match does not exist at this level and $f_i$ will be 1 if bits 1 to i match and 0 otherwise. Thus, g will be 1 if all l bits of a and b match and 0 otherwise. The function is secure and does not allow for leakage of any information about a and b other than whether or not they match.

Note that there are more efficient implementations of compare and the above implementation was chosen as an example because of its simplicity and in embodiments of the systems and methods where performance is an issue, it is expected that more efficient implementations would be used.

With respect to order comparison, building on top of the compare and xor functions, it is possible to securely match orders in such a way that no information about orders is leaked other than whether or not they match.

Take, for the sake of example, an order with two just two attributes a symbol which identifies the security being traded and a side which can be buy or sell. For two orders to match they must have the same symbol and opposite sides. Symbols will be represented as l bit integers and side will be 1 for a buy and 0 for a sell. A function which takes bitwise sharings of each order's symbol and a share of the side and returns $[c]_p$ where c is 1 if the orders match and 0 if they don't can be implemented as follows:

---
match($[symbol_a]_{B_l}, [symbol_b]_{B_l}, [side_a]_p, [side_b]_p$)
---
$[a]_p \leftarrow$ compare($[symbol_a]_{B_l}, [symbol_b]_{B_l}$)
$[b]_p \leftarrow$ xor($[side_a]_p, [side_b]_p$)
$[c]_p \leftarrow [a]_p[b]_p$ The function is secure because no information other than whether or not the orders match is leaked i.e. when orders do not match the function only reveals that they did not match but not whether it was because the symbol was different or the side was different or both. Some orders will have more attributes than just a symbol and side but by complementing the compare and xor algorithms with a secure less than algorithm the match algorithm can be extended to handle orders of arbitrary complexity that contain attributes such as limit prices and minimum acceptable quantities.

Additional algorithms for effectuating value comparisons for shared secrets are provided below. In one embodiment, example comparison and equality algorithms that are suitable for use in accordance with the present disclosure can be found in Unconditionally Secure Constant-Rounds. Multi-Party Computation for Equality, Comparison, Bits and Exponentiation, Damgård I., Fitzi M., Kiltz E., Nielsen J. B., Toft T. (2006) *Unconditionally Secure Constant-Rounds Multi-party Computation for Equality, Comparison, Bits and Exponentiation*. In: Halevi S., Rabin T. (eds) *Theory of Cryptography. TCC 2006. Lecture Notes in Computer Science*, vol 3876. Springer, Berlin, Heidelberg 2006. This document is hereby incorporated by reference herein in its entirety for all purposes. Example Interval, Equality, and Comparison are described in publication Multiparty Computation for Interval, Equality, and Comparison without Bit-Decomposition, Nishide T., Ohta K. (2007) *Multiparty Computation for Interval, Equality, and Comparison Without Bit-Decomposition Protocol.* In: Okamoto T., Wang X. (eds) *Public Key Cryptography—PKC 2007. PKC 2007. Lecture Notes in Computer Science*, vol 4450. Springer, Berlin, Heidelberg. This document is hereby incorporated by reference herein in its entirety for all purposes.

With respect to protocols used by the processor nodes A, the system is made up of three or more Processor Nodes A which are intended to be segregated both physically and organizationally (i.e., they should be operated by distinct organizations).

Order data is distributed to and securely processed by nodes using the secret sharing algorithms described supra. This ensures than an adversary with a view of a limited subset of the nodes has no visibility on the underlying order data or results of any operations performed on that data. Application logic is duplicated and run in parallel across all Processor Nodes A and combined with an authentication scheme that requires any operation performed on the data to be approved by all processors nodes before it can occur. This prevents an adversary who gains control of a subset of the processor nodes from performing operations that would reveal order data in a manner that was inconsistent with the application logic.

Figure 2:
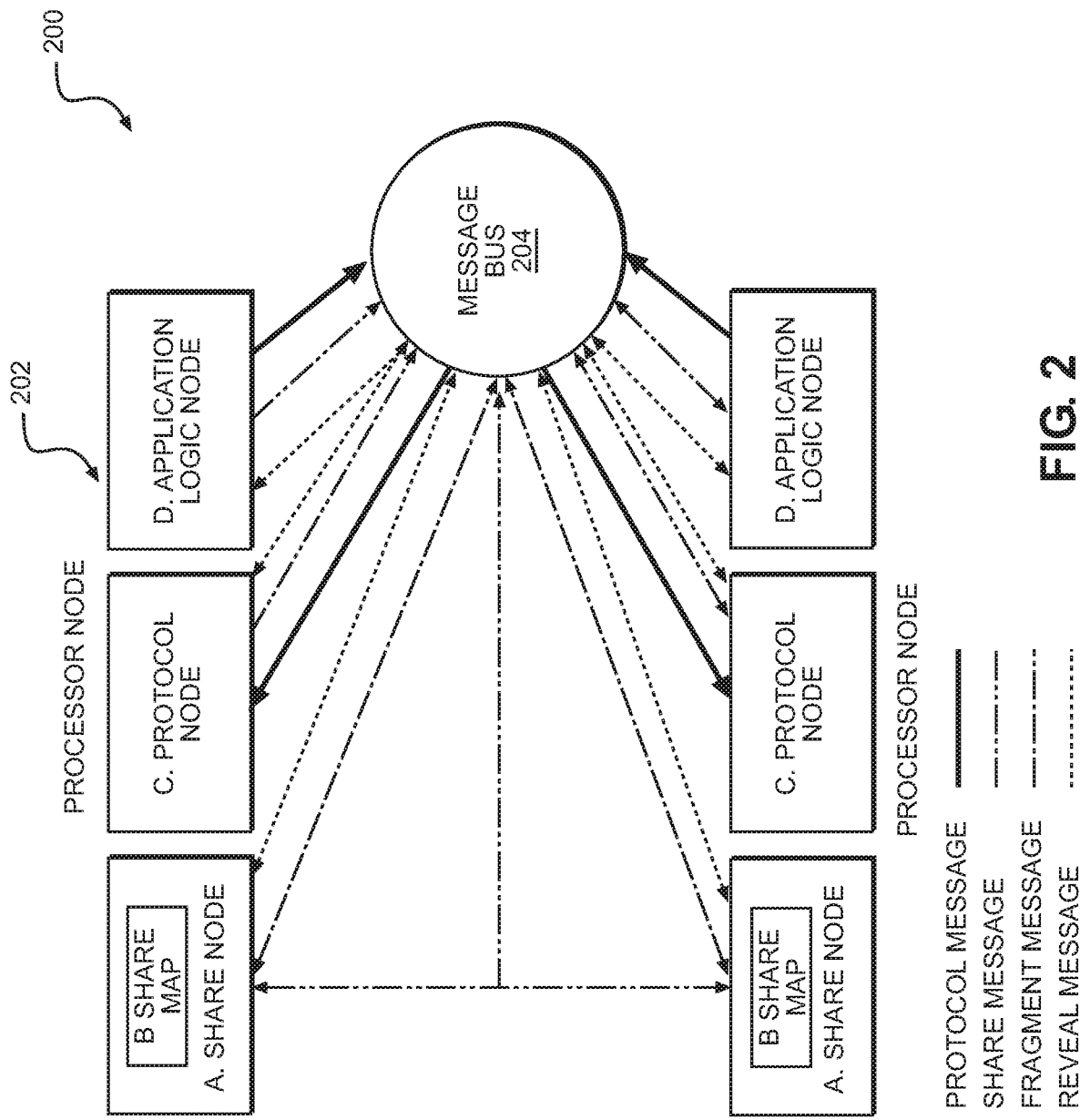
FIG. 2 is a schematic diagram of example components of the processor nodes of the system of FIG. 1.

An example distribution of order data and application logic is applied to effectuate security of the system. FIG. 2 illustrates example components of the processor nodes, such as processor node 202 and the messages that are passed among them via the message bus 204.

In some embodiments, each of the processor nodes comprises three main components. On component is share nodes A which implement the share level operations of multiplication, addition, multiplication by a scalar, and random described above on secret shares. Share nodes comprise a share map B that stores secret shares for order attributes and the intermediate and final results of operations performed on those shares and maintains a mapping between a unique ID and each share.

Protocol nodes C implement secure higher-level functions above, such a xor and compare. Application logic nodes D are also included in the processor node 202 that implement the application level functionality of matching orders described in greater detail supra.

In some embodiments, there are four distinct categories of messages exchanged among node components. These are described in the following table:

In some embodiments, processor nodes are designed to be executed on machines with multiple cores and the message bus 204 implements functionality to maximize parallelism and minimize blocking. In various embodiments, this is achieved by making all messages asynchronous and exposing message dependencies and share states to the message bus 204. When the message bus 204 receives a new share message it checks the state of each of the shares on which the message is dependent. The state can either be ready if the share has already been created or not ready in case the share has not yet been created or is only partially created[1]. It will be understood that the output of a multiplication operation that is constructed from fragments created by each share node A would be considered to be partially complete if it had not yet received all fragments. The output of a multiplication operation that is constructed from fragments created by each share node would be considered to be partially complete if it had not yet received all fragments.

In some instances, if all the inputs for a share message are ready, it will be sent to a share node A where it will be processed by a worker thread therein. If one or more inputs for a share message are not ready, the message will be placed in an awaiting dependencies queue. Each time a share node A completes an operation, it will notify the message bus 204 which will search the awaiting dependencies queue for messages that are dependent on the output of that operation. If there are any, it will re-check all the input dependencies for those messages and either leave them in the queue if there are still input dependencies which are not ready or send them to a share node if all dependencies are ready.

Note that the above logic is performed by a component of the message bus 204 which runs in the same process as the share node A meaning which allows for efficient querying of share states and notification of message completion.

The following paragraphs describe an example use case the above logic using the xor example described above. In more detail, id1, id2, . . . represent the unique ID's of secret sharings; operation_name(output, [inputs]) represent a Share Message where: operation_name is the name of the operation; output is the the ID of the secret share that will contain the output of the operation; inputs is a list of one or more share ID's and/or constants that are the input to the operation.

An equation fragment(output, number, F) represents a Fragment Message is utilized where: output specifies the id of target id of the share for this fragment operation; and

| Category | Description | Sender | Receiver |
| --- | --- | --- | --- |
| Share Message | A request to perform a share level operation to assign a value to a share or perform an operation such a scalar multiplication, multiplication, or addition on or more shares. | Application Logic Node/ Protocol Node | Share Node |
| Fragment Message | The partial result of a multiplication or random operation. Fragment Messages are sent from each share node to every other share node and reassembled to create a sharing of multiplication or random result. | Share Node | Share Node |
| Protocol Message | A request to perform a higher level operation such as xor or compare. | Application Node/ Protocol Node | Protocol Node |
| Reveal Message | A request to reveal a share. | Application Node/ Protocol Node | Share Node (Application Node/ Protocol Node) | number specifies the Share Node number for which this fragment is intended F is a placeholder for the actual fragment value.

The table below provides an example of the above for the xor operation on the sharing of two-bits $[a]_p$ and $[b]_p$ as described above. The example assumes that the share ID for $[a]_p$ is id1 and the share id for $[b]_p$ is id2. For the sake of example there are just two Share Nodes. In some embodiments, a number of nodes will be of the form 2n+1 where n is a positive integer. So two would never be a valid number of nodes in this example.

A single protocol processor (e.g., processor node) is assumed to be generating the sequence of operations to perform the xor and store the final result in id6.

| Step | Protocol Processor Node Action | Share Node 1 Action | Share Node 2 Action | Message Bus Action | Awaiting Queue |
|---|---|---|---|---|---|
| 1 | add(id3, [id1, id2]) | | | forward add(id3, [id1, id2]) to Share Nodes | |
| 2 | multiply(id4, [id1, id2]) | | | forward multiply(id4, [id1, id2]) to Share Nodes | |
| 3 | multiply(id5, [2, id4]) | | | add multiply(id5, [2, id4]) to Awaiting Queue | multiply(id5, [2, id4]) |
| 4 | subtract(id6, [id4, id5]) | | | add subtract(id6, [id4, id5]) to Awaiting Queue | subtract(id6, [id4, id5]) multiply(id5, [2, id4]) |
| 5 | | add(id3, [id1, id2]) | | | subtract(id6, [id4, id5]) multiply(id5, [2, id4]) |
| 6 | | | add(id3, [id1, id2]) | | subtract(id6, [id4, id5]) multiply(id5, [2, id4]) |
| 7 | | multiply(id4, [id1, id2]) -> fragment(id4, 2, F) | | forward fragment(id4, 2, F) to Share Node 2 | subtract(id6, [id4, id5]) multiply(id5, [2, id4]) |
| 8 | | | multiply(id4, [id1, id2]) -> fragment(id4, 1, F) | forward fragment(id4, 1, F) to Share Node 1 | subtract(id6, [id4, id5]) multiply (id5, [2, id4]) |
| 9 | | process fragment(id4, 1, F) | | forward multiply(id5, [2, id4]) to Share Node 1 | subtract(id6, [id4, id5] ~~multiply(id5, [2, id4])~~ |
| 10 | | | process fragment(id4, 2, F) | forward multiply(id5, [2, id4]) to Share Node 2 | subtract(id6, [id4, id5]) |
| 11 | | multiply(id5, [2, id4]) | | forward subtract(id6, [id4, id5]) to Share Node 1 | ~~subtract(id6, [id4, id5])~~ |
| 12 | | | multiply(id5, [2, id4]) | forward subtract(id6, [id4, id5]) to Share Node 1 | |
| 13 | | subtract(id6, [id4, id5]) | | | |
| 14 | | | subtract(id6, [id4, id5]) | | |

Because all messages are asynchronous and the share nodes have multiple processing threads, the entire xor operation is performed without blocking and a maximum degree of parallelism. The processor node 202 does not need to wait for the completion of any share messages and many of the share messages can be processed in parallel in four groups: 5-8, 9-10, 11-12, and 13-14. Additionally, while waiting for fragments to arrive, the share nodes A are free to process share messages unrelated to the xor operation.

Some embodiments of the present disclosure may utilize secure encryption. While some messages reference secret shares by ID and may not require any sort of encryption to guard against an adversary who may be listening on the message bus 204 or the underlying network on top of which the message bus 204 runs. However, some messages such as fragment messages may benefit from encryption. The below table describes the encryption scheme used for those messages.

| Message Type | Encryption Method |
|---|---|
| Fragment Message | Each pair of Share Nodes exchange symmetric encryption keys at system startup. The key is used by the pair to encrypt Fragment Messages to each other. |
| Assign Messages | All order data is broken into secrets and each secret is encrypted with the public key of the corresponding Share Node by an Encryption Gateway running at the Institutional Investor side. The encrypted shares are then inserted into Assign Messages by Application Nodes. |
| Reveal to Public Key Messages | Share Nodes maintain lists of public keys for all valid destination brokers. Share Data is encrypted with the public key of a Broker at the Share Node before being revealed. It is decrypted at the broker side by a Decryption Gateway. |

Some embodiments use AES with Galois/Counter mode (GCM). Other embodiments use AES with GCM to perform symmetric encryption on the shares and Optimal Asymmetric Encryption Padding (OAEP) with RSA to encrypt the AES key. However, any similarly secure encryption scheme could also be used. As is the case with Assign Messages the systems and methods use AES with GCM and OAEP with RSA.

Figure 3:
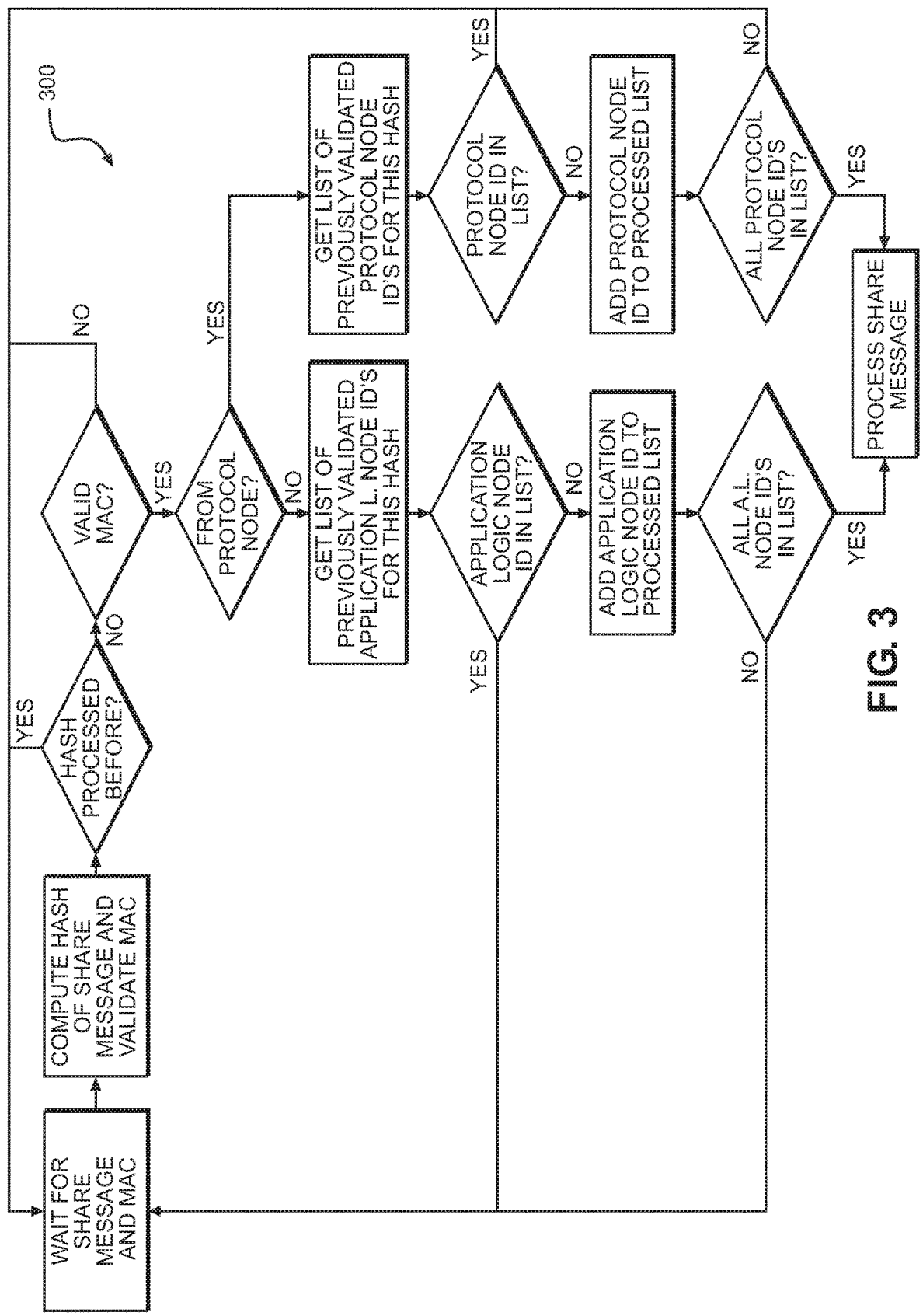
FIG. 3 is a flowchart of an example authentication method of the present disclosure.
Figure 4:
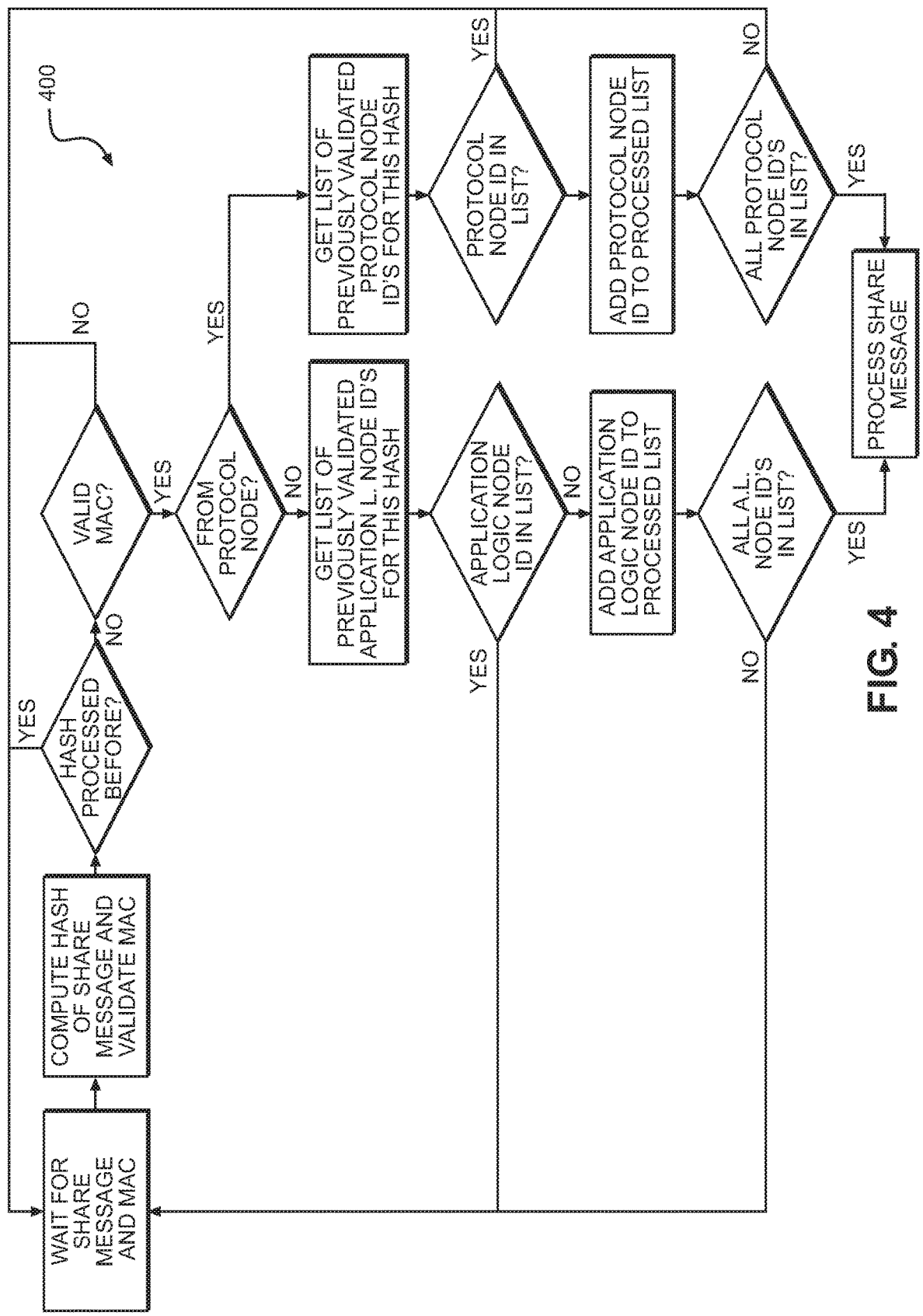
FIG. 4 is a flowchart of an example authentication method for share messages.
Figure 5:
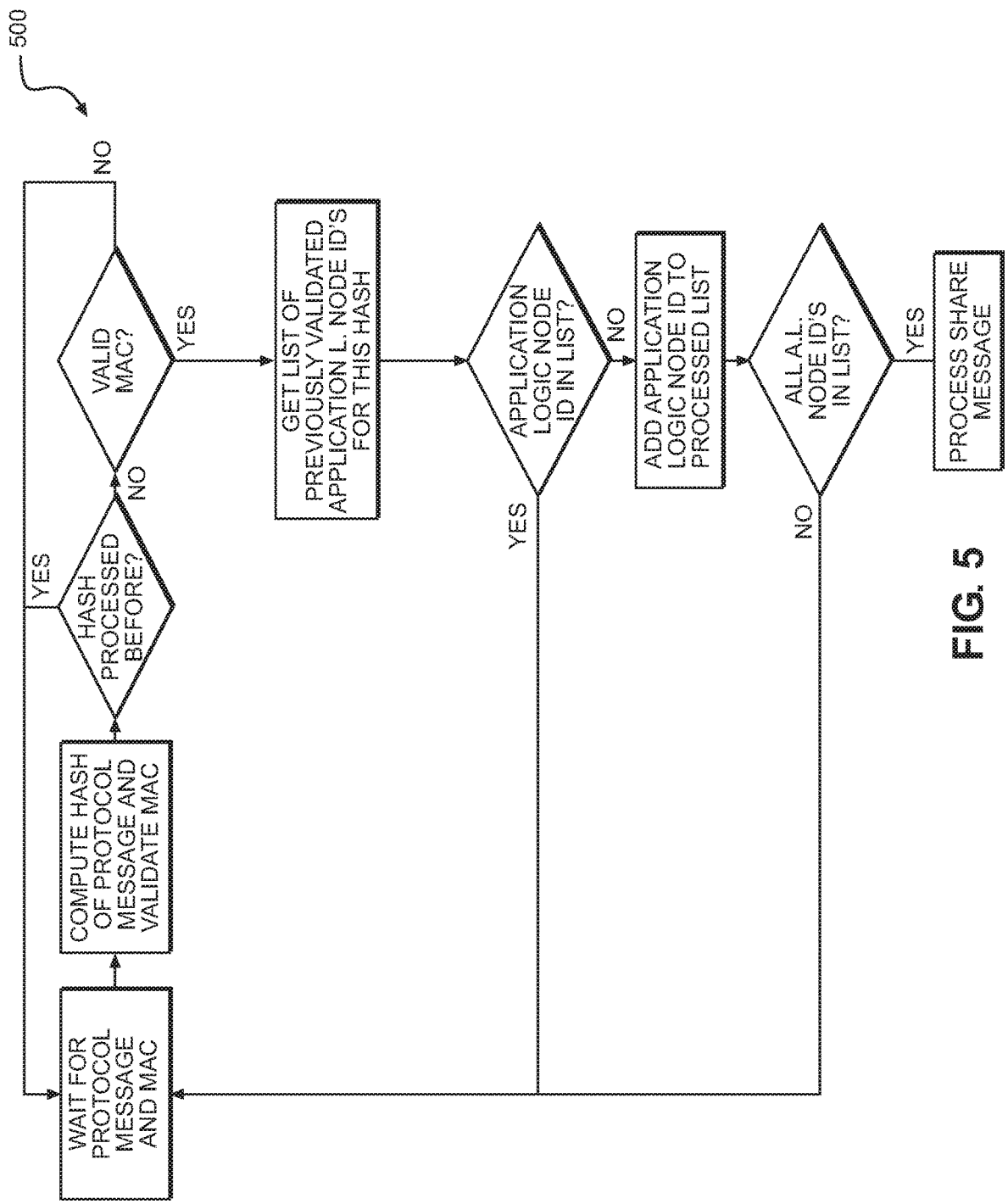
FIG. 5 is a flowchart of an example protocol message flow.

An example authentication method 300 is illustrated in FIG. 3. FIG. 4 illustrates an example authentication flow 400 for share messages. An example authentication flow 500 for protocol messages is illustrated in FIG. 5.

In some embodiments, storing order data as shared secrets to protect against one or more share nodes being compromised is meaningless if an adversary is able to gain control of a single processor node or application node and issue commands to the share nodes which reveal information about the underlying orders. For example, an adversary could create shares corresponding to every stock code for a given market and then issue compare operations to compare each stock code with the stock code of a particular order until it found a match, thus learning the stock code of the order.

To prevent against this protocol messages are processed by each protocol node which generates an identical set of share messages to process a protocol message as every other share node. Protocol nodes compute a hash of every share message they create and generate a message authentication code (MAC) of the hash using a different secret key for each share node. The MAC is sent along with the share message to the share nodes.

Similarly, application logic nodes generate an identical set of share messages and protocol messages in response to the same order coming from the matching engine as every other application logic node. Application logic nodes compute the hash of every share message and protocol message they create and generate a MAC of the hash using a different secret key for each share node and protocol node. The MAC is sent along with the corresponding share message or protocol node to the share nodes or application nodes respectively. As noted above, FIG. 3 illustrates the authentication flow at the share node. Upon receiving a share message from a protocol node or application logic node, a share node first computes the hash of the share message. If the share mode has already processed a share message corresponding to the hash it will ignore the message. In some embodiments, this accomplished efficiently by adding a time to live (TTL) on each message at creation time. The TTL is generated such that it will be the same for all instances of the message and included in the hash. When checking if a message has been processed before, it is assumed that all messages with expired TTL's have been. Thus, only a cache corresponding to hashes of messages with unexpired TTL's needs to be maintained a queried.

Otherwise it will validate the mac using the secret key of the corresponding protocol node or application. Once validated the share node processes the message if it has already received and validated the same message from all other processor nodes or application nodes. If not, it will store a record of the fact that it has validated the message for the sending protocol node or application logic node and wait to receive the message from all the other protocol nodes or application logic nodes.

The authentication logic for protocol messages at the protocol node is very similar and is illustrated in FIG. 4, as noted above. Protocol messages have a unique message ID which is used to generate the message IDs and share IDs generated by the operation specified by the protocol message in a deterministic manner. This ensures that the share messages generated by each protocol node in response to a particular protocol message will be identical.

In some embodiments, share messages have, as a parameter, a message ID which is unique to the message. This ensures that even if two share messages are of the same type and have identical parameters, the hash will be different and they will be treated as two separate messages when processed by share nodes.

These next sections introduce some notation and provide pseudo code of a protocol message that implements the xor example described above.

The following example is guided by the following notations: id1, id2, . . . represent unique IDs; id_generator (id, i) a function that takes as input an ID, id, and an integer i and generates a new unique ID; operation_name(msg, output, [inputs]) represents a share message where: msg is a unique id that identifies this message; operation_name is the name of the operation; output is the the id of the secret share that will contain the output of the operation; and inputs is a list of one or more share ID's and/or constants that are the input to the operation. In some embodiments, hash(message) is a collision resistant hash function that takes as input a share message and generates a hash value for that message; $key_{ij}$ a secret key shared between the i'th protocol node and j'th share node that is used to create a MAC; mac(hash, key) a function for generating a secure MAC; and send(msg, mac, node) a function to send a message and MAC to a share node.

The following descriptions provide additional detail regarding xor functions in a pseudocode format. In general input parameters for the xor functions are as follows: msg_id—the ID of the Protocol Message that initiates the xor; target_id—the ID of the secret share that will hold the result; and source_id_a, source_id_b—the IDs of the sharing of the input bits. An example pseudocode segment is provided below:

xor(msg_id, target_id, source_id_a, source_id_b)

```
counter = 1
i = executing Protocol Node ID
id1 = id_generator(msg_id, counter++)
id2 = id_generator(msg_id, counter++)
hash = hash( add(id1, id2, [source_id_a, source_id_a])
for j = 1 to number_of_share_nodes
    mac = mac(hash, key_ij)
    send(add(id1, id2, [source_id_a, source_id_a]), mac, j)
id3 = id_generator(msg_id, counter++)
id4 = id_generator(msg_id, counter++)
hash = hash(multiply(id3, id4, [source_id_a, source_id_a]))
```

```
xor(msg_id, target_id, source_id_a, source_id_b)
```

```
for j = 1 to number_of_share_nodes
    mac = mac(hash, key_ij)
    send(multiply(id3, id4, [source_id_a, source_id_a]), mac, j)
id5 = id_generator(msg_id, counter++)
id6 = id_generator(msg_id, counter++)
hash = hash(multiply_by_scalar(id5, id6, [2, id4]))
for j = 1 to number_of_share_nodes
    mac = mac(hash, key_ij)
    send(multiply_by_scalar(id5, id6, [2, id4]), mac, j)
id7 = id_generator(msg_id, counter++)
hash = hash(subtract(id7, target_id, [id2, id6]))
for j = 1 to number_of_share_nodes
    mac = mac(hash, key_ij)
    send(multiply_by_scalar(subtract(id7, target_id, [id2, id6]), mac, j)
```

It will be understood that some types of orders could require comparison with market data as part of the matching process. For example, orders that specify both a limit price and a benchmark such as midpoint or market open price in order. To do this securely the systems and methods implement a secure market data feed.

Figure 6:
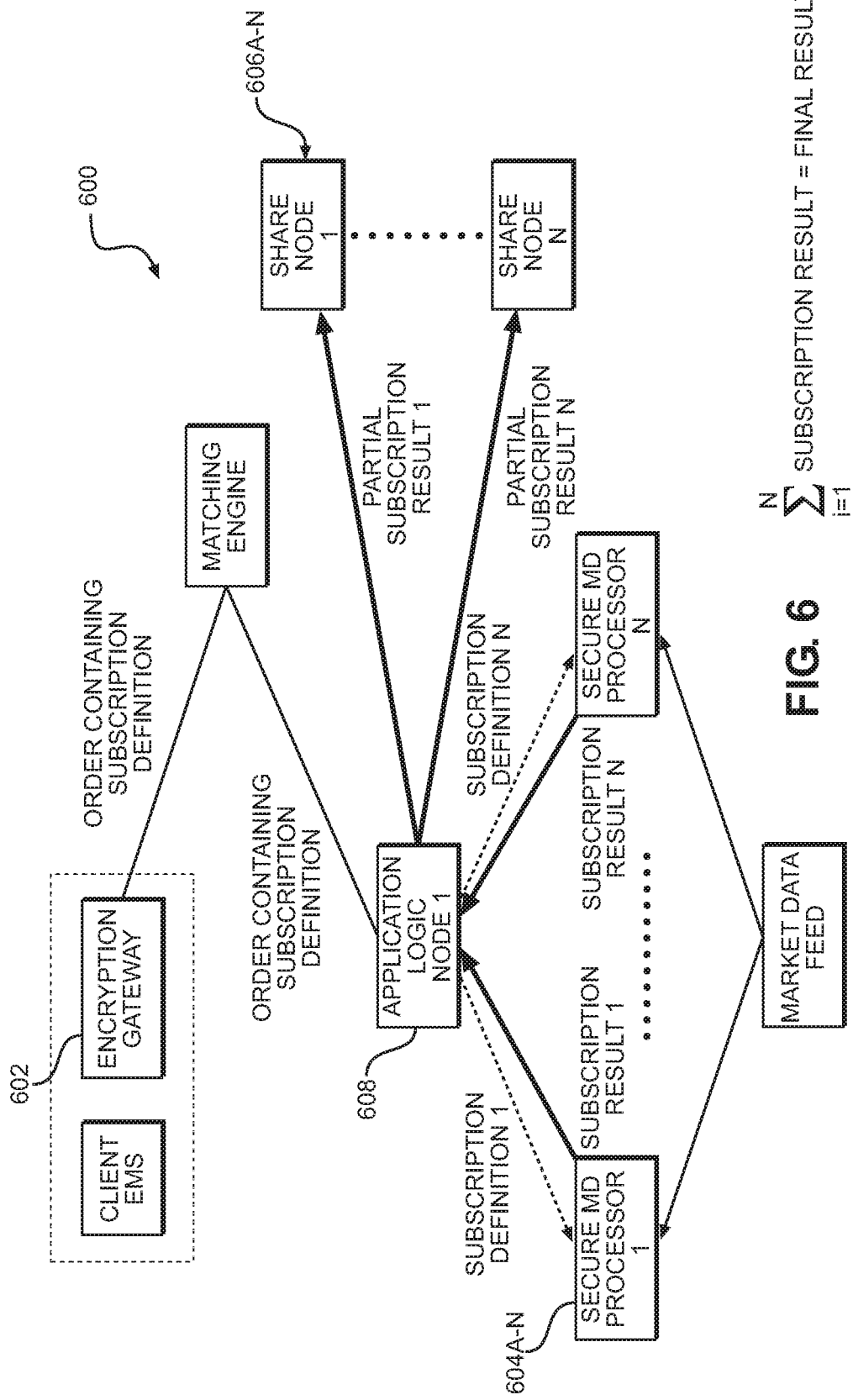
FIG. 6 illustrates an example secure market data feed method.

FIG. 6 illustrates an example secure market data feed method or flow 600. The secure market data feed is comprised of multiple secure market data processors (e.g., processor nodes) which are intended to be operated by distinct organizations. The secure market data processors could be operated by the entities running processor nodes but they do not necessarily need to be. Institutional investors create a subscription definition which is broken into n parts where n is the number of market data processors and encrypt each definition with the public key of the corresponding market data processor. These definitions collectively represent one symbol, but it is impossible to gain any information about which symbol without viewing all the definitions (i.e., without compromising all the secure market data processors). These definitions are then passed to the market data processors along with a field indicating what type of price is desired for that symbol such as mid, open, or close and the market data processor will each return a shared secret that is encrypted with the public keys of each of the share nodes. When these shared secrets are added together, the result will be the desired price.

To create a subscription definition for an order, an encryption gateway 602 creates an additive secret sharing for every security in the relevant universe that will be equal to 1 if the security is equal to s or 0 otherwise according to the following pseudo code where: $z_p$ is a prime field; S is the set of all codes in the relevant universe of securities; s∈S defines the security corresponding to the subscription; and N is the number of Secure Market Data Processors, such as secure MD processors 604A-N.

```
for i ∈ S
    for j = 1 to N-1
        choose r_ij uniformly at random in Z_p
    if s = S
        choose r_iN so that Σ_{j=1}^{N} r_ij mod_p = 1
    else
        choose r_iN so that Σ_{j=1}^{N} r_ij mod_p = 0
```

The encryption gateway 602 packages the additive share values for a particular processor, p, i.e. $\{r_{ij}|j=p\}$ and encrypts them with the public key of the processor to create a subscription definition. Given a subscription definition a secure MD processors 604A-N, m, will create a partial subscription result according to the following formula:

$$\text{partial\_subscription\_result} = \Sigma_{i \in S}\, \text{price}(S, \text{type}) r_{im} \bmod_p$$

where S is the set of all codes in the relevant universe of securities; price(security, type) is a function that returns the current price for a security; and type where type specifies the type of price desired e.g. midpoint or open.

After computing a partial subscription result, at least one of the secure MD processors 604A-N creates a secret sharing of the result and encrypts each share with public key of the corresponding share node (such as share nodes 606A-N) and returns the result to the application nodes (e.g., application logic node 608 for example). The application logic nodes assign each partial subscription result to a share and instruct the share node to securely add them up together. The result will be a secret sharing of the price of the security defined in the secure market data definition that can be securely compared with the limit prices of orders.

Because the r values are chosen uniformly randomly in $Z_p$ and a sharing for every symbol in the universe is included in the definition, even an adversary with a view of all but one of the cure MD processors 604A-N gains no information about the underlying security that is defined by the underlying subscription definition.

Figure 7:
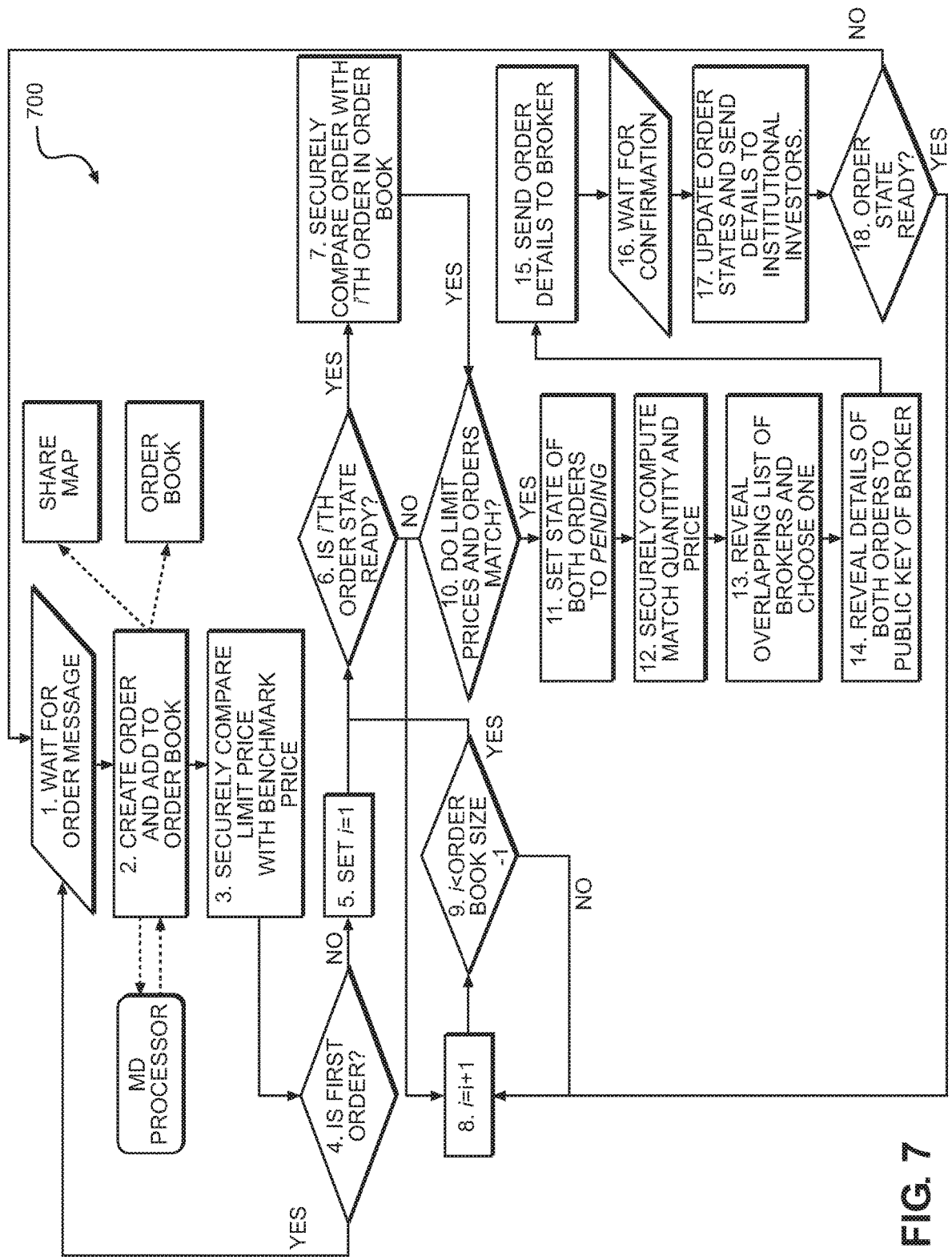
FIG. 7 illustrates an example application-level flow, which is implemented by each of the application logic nodes.

FIG. 7 illustrates an example application-level flow, which is implemented by each of the application logic nodes such as application logic node 608. In some embodiments, in step 1, application logic nodes wait for order messages created by an instance of an encryption gateway running at an institutional investor. The messages are received from the matching engine which is acting as a message router. As described above all order attributes are broken into secret shares that are encrypted with the public keys of share nodes and packaged into an order message with is signed with the public key of the institutional investor. The order message may also include a subscription definition. Order attributes can include but are not necessarily limited to the following: the security identifier of the order; the side of the order (buy or sell); the quantity of the order; the benchmark price for the order e.g. day VWAP, mid-point, open, or close; a minimum acceptable match quantity for the order; a limit price for the order; a time in force for the order; and the broker list of the order.

It will be understood that when the matching engine passes an order message to the application logic nodes it includes a generated value that will be used as the seed for all subsequent message and share id's generated while processing the order message. This ensures that application logic nodes will generate the exact same set of protocol messages and share messages in response to the same order message.

In step 2, upon receiving an order message each application logic node (ALN) first validates the order message signature with the institutional investor's public key. It then generates assign messages to create shares of each of the order attributes and store the IDs of each of those shares in a local order object. It adds the order object to the end of an array stored in the ALN, referred to as the order book. If the order has a secure subscription definition it makes a subscribe request for it to the secure market data processors.

In step 3, if relevant, upon receiving all partial secure subscription results, an ALN will instruct the share nodes to create a sharing of the partial subscription result and securely add them together to create the subscription result. It will issue a series of instructions to the protocol nodes to securely compare the order's limit price with the subscription result without revealing the result of the comparison.

In step 4, if this is the first order received, the ALN will go back to step 1. In step 5, the ALN initializes the order book counter i. In step 6, each order in the order book has an state that is maintained by the ALN. At the most basic level, the states can include any of ready—order is ready for matching; pending—order is awaiting a confirmation from a broker; filled—the order has been completely filled; and/or cancelled—the order has been cancelled. In this step the ALN checks to see if the i'th order in the order book is ready, if not the ALN skips to step 8.

In step 7 the ALN generates the necessary share messages and protocol messages to securely compare the i'th order in the order book with the current order to see if they match. This includes but is not limited to the current types of comparisons: are the security identifiers of the orders the same?; are the sides of the orders opposite?; is the minimum accepted quantity of each order greater than or equal the quantity of the other order?; are the benchmark prices the same?; and is there at least one overlapping broker in the broker lists of both orders?

The results of each comparison are stored as the secret sharing of a binary value. A secure and operation is computed across all results plus the results of each order's comparison with the benchmark price and the logic skips to step 10.

Step 8 is performed when a current order and the i'th order in the order book cannot be matched by the ALN. This can be for one or more of the following reasons: the limit price of the i'th order is out of range of the benchmark price; the limit price of the current order is out of range of the benchmark price; and one or more of the order attributes of the current order does not properly match against the appropriate corresponding order attribute of the i'th order e.g. the minimum acceptable quantity of the current order is greater than the quantity of the i'th order, the security identifiers of the orders are different, the sides are the same, and so forth.

It is noteworthy that the exact reason(s) that the orders cannot be matched are not visible to the ALN. The only thing that is visible is the result of the secure and comparison that was applied to the result of each of the individual comparisons. In some embodiments, the value of i is incremented and the logic moves to step 9. In step 9 the ALN checks to see if there are more orders in the order book to compare and, if so, skips to step 6 to start the comparison process with the next order. Otherwise, the ALN goes back to step 1 and waits for a new order to be received.

In step 10 the ALN checks the result of the and operation in step 7 and either goes back to step 8 in case there was no match or step 11 if there was a match. In step 11 the ALN updates a state of both orders to pending to indicate that they are waiting on confirmation from a broker and prevent them from being matched with another order. In step 12 the ALN generates messages to securely compute the match price and quantity of the match. In step 13 the ALN generates messages to securely compute the overlap of the broker lists and reveals them. The ALN then either chooses one randomly or according to some other prescribed methodology.

In step 14, sharings of the relevant attributes of both orders including the match price and match quantity are encrypted by with the public key of the broker and revealed by each share node. In step 15 the encrypted sharings are packaged up into two order messages and sent to the broker via the matching engine. The broker decrypts them and reassembles them in an instance of an encryption gateway running at the broker side. The broker matches the orders, reports the trade in-line with regulatory requirements, and returns a confirmation.

In step 16 the ALN waits for the confirmation from the broker, and upon receiving the confirmation the broker updates the states of the orders on the order book in step 17. For each order, the ALN creates messages to reveal sharings of the order attributes including the match price and quantity that have been encrypted with the public key of the corresponding institutional investor, packages them up in an order confirmation and sends them back to the institutional investor In step 18 the checks the updates state of the current order to see if it is ready for more matching which will be the case if the entire quantity has not matched. If so the logic skips to step 8. Otherwise the logic returns to step 1 where the ALN waits for the next order.

The following examples include additional descriptions of embodiments and features that can be implemented according to the present disclosure. As noted above, order information leakage is a perennial source of concern for institutional investors. It can influence the behavior of both human and machine market participants in a way that adversely impacts prices, resulting in increased slippage and eroded investment returns, leading investors to take various steps to reduce information leakage. One approach has been to utilize trading algorithms which can disguise the true size and price of large orders by breaking them into smaller orders which are exposed to the market in-line with parameters specified by traders.

Another approach has been to leverage the services of agency trading desks to find a match for large orders. Agency desks see the order flow from many different firms and thus may be able to identify institutions that would be willing to trade the opposite side of a large order off—exchange at a price that would be much more favorable than one could expect to achieve by executing it in the market.

Yet another approach has been to send orders to a dark pool where they can be matched automatically without human involvement by a machine. Unfortunately for institutional investors, all of these approaches suffer from the same fundamental problem that they require investors to expose their order flow to one or more third parties who may either intentionally or unintentionally leak the information or act upon it.

The systems and methods herein allow institutional investors to trade stocks with each other in a way that provides an unprecedented level of privacy and anonymity by distributing order data and application logic across multiple, independent nodes operated by distinct organizations. This ensures that it is impossible for any one organization or individual to see another firm's orders. The systems and methods also allow institutional investors to specify a list of brokers they would be willing to use to execute their order and only exposing the orders to those brokers after a match has been found. This is opposed to existing workflows that require investors to send their flow to a specific broker for matching (or execution in an algorithm or dark pool) before it matches which gives the broker a view onto the entirety of those investor's unexecuted flow including limit prices and full quantities.

Figure 8:
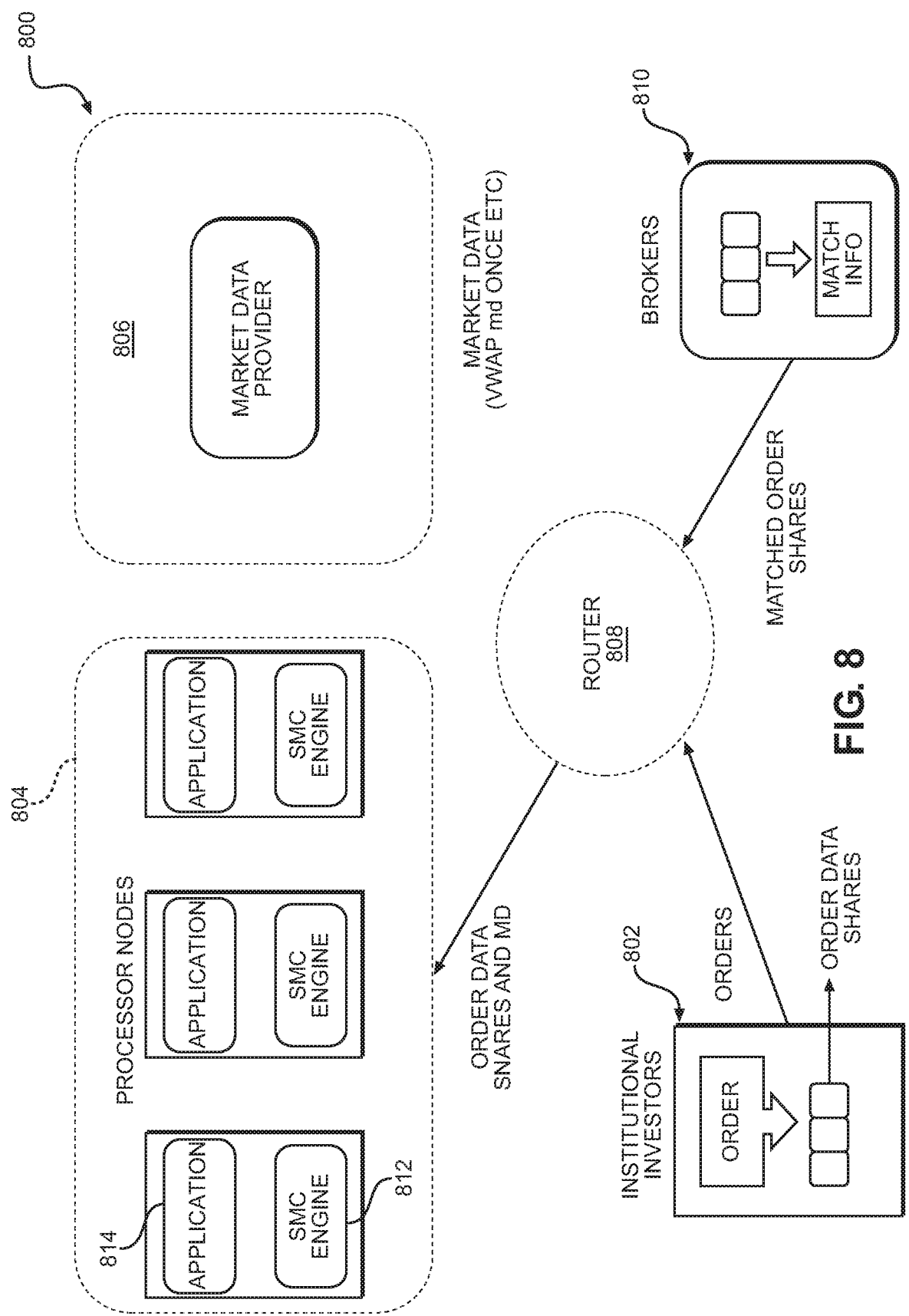
FIG. 8 is a schematic diagram of another example system of the present disclosure.

FIG. 8 illustrates another example system 800 of the present disclosure. In general, the system 800 comprises institutional investor systems 802, processor nodes 804, a market data provider system 806, a router 808, and broker systems 810. Institutional investor systems 802 break each of the attributes of their orders into a bitwise representations and then using a secret sharing scheme the individual bits are broken into shares.

The shares of the order attributes are packaged up into order messages. Each order message is encrypted with the private key of the institutional investor systems 802 and the public key of the destination processor node(s) 804. The institutional investor systems 802 sends order messages to the router 808 over a network connection.

The router 808 routes the shares of the order attributes to the corresponding processor nodes 804. All messages containing shares of a particular order pass through the router 808, but in an encrypted form so the router 808 cannot read them. The purpose of the router 808 is to enforce a canonical linear order over the messages so that all processor nodes 804 receive them in the same order.

The price comparisons require a benchmark price such as midpoint, VWAP, open or close. That price is retrieved through a market data provider system 806. Processor nodes 804 take the secret shares of the symbol name in every order they receive and compute a subscription definition. The subscription definition is an array of bits of which only one can be one and all others are zeroes. It shows the position of the order symbol in a list containing all symbols in the universe.

Upon receiving a new market data feed from a provider each of the processor nodes 804 uses the subscription definition selects the benchmark price for every order. The result will be a secret sharing of the price of the security defined that can be securely compared with the limit prices of orders.

Processor nodes 804 are the core of the system 800. The system 800 comprises three or more processor nodes 804 in some embodiments, which are intended to be segregated both physically and organizationally (i.e. they should be operated by distinct organizations). Processor nodes 804 have two main components: a secure multi-party computation engine (SMC 812) which implements the share level operations of multiplication, addition, multiplication by a scalar, and random and higher level functions such as xor and compare; and application nodes (AN 814) that implement the application level functionality of adding, removing, updating orders and matching orders described in the next section.

Figure 9:
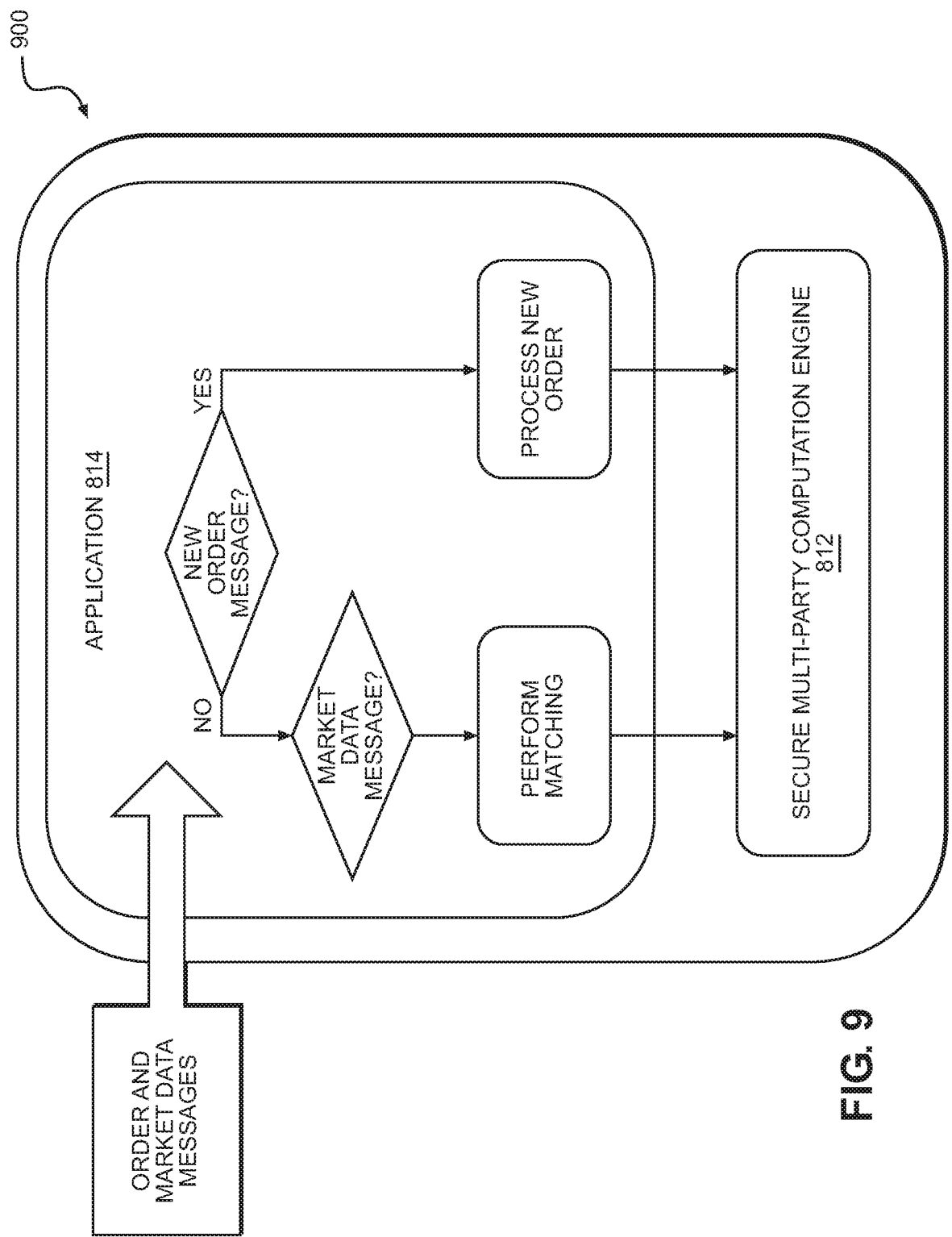
FIG. 9 illustrates an example application flow within the system of FIG. 8.

FIG. 9 illustrates an example application flow also with reference to FIG. 8. ANs (e.g., 814) wait for order messages or market data messages from the router 808. As described above all order attributes are broken into secret shares that are encrypted with the public keys of processor nodes 804 and packaged into an order message. In the current implementation an order has the following attributes: an ID of the order; the side (party) of the order; the security identifier of the order; a limit price for the order; the quantity of the order; a minimum acceptable match quantity for the order; and the broker list of the order.

Figure 10:
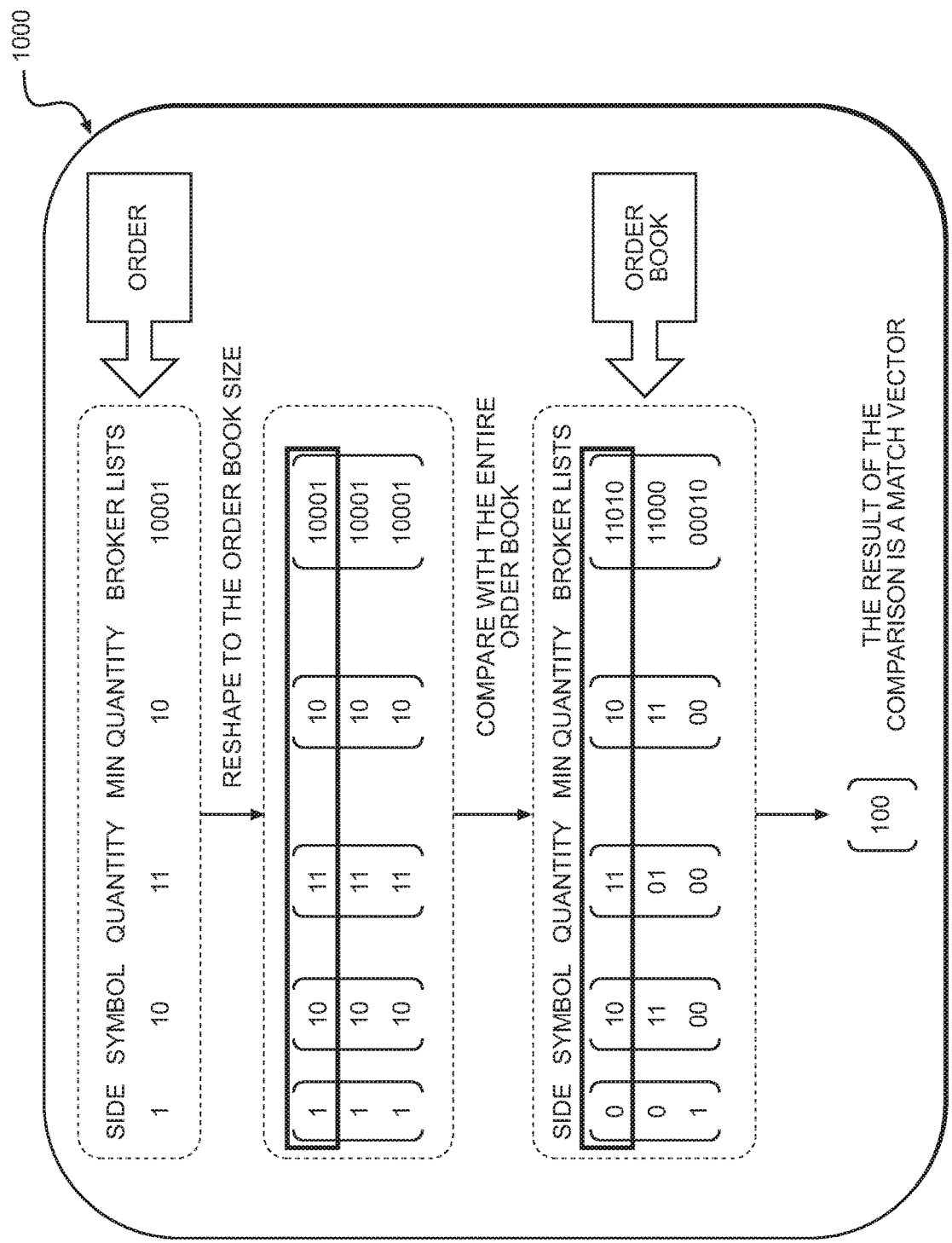
FIG. 10 illustrates an example order comparison operation.

FIG. 10 illustrates an example order comparison operation. Upon receiving an order message each application node first validates the order message signature with the institutional investor's public key. It then creates a local order object which holds the secret shares of all attributes. The next step is validation of the order. If the order is valid it is added to an object stored in the application node, referred to as the order book (OB) and then compared with the entire OB. Order attributes used for the comparison are side, symbol, quantities and broker lists. The result of the comparison is a match vector showing the positions of all matching orders in the order book for the new order (without the price).

For the purposes of clarity and simplicity of description all order attributes are represented as bits whereas in the real application they are shared secrets of the individual bits.

For example a match vector "1 0 0" means the new order can be matched with the order at index zero from the order book. This process repeats for every new order message until a market data message is received. When a new market data message arrives AN 814 performs an order matching with the new market data. The operations for processing a new order and performing a match are synchronized, meaning only one of them can happen at the same time.

Figure 11:
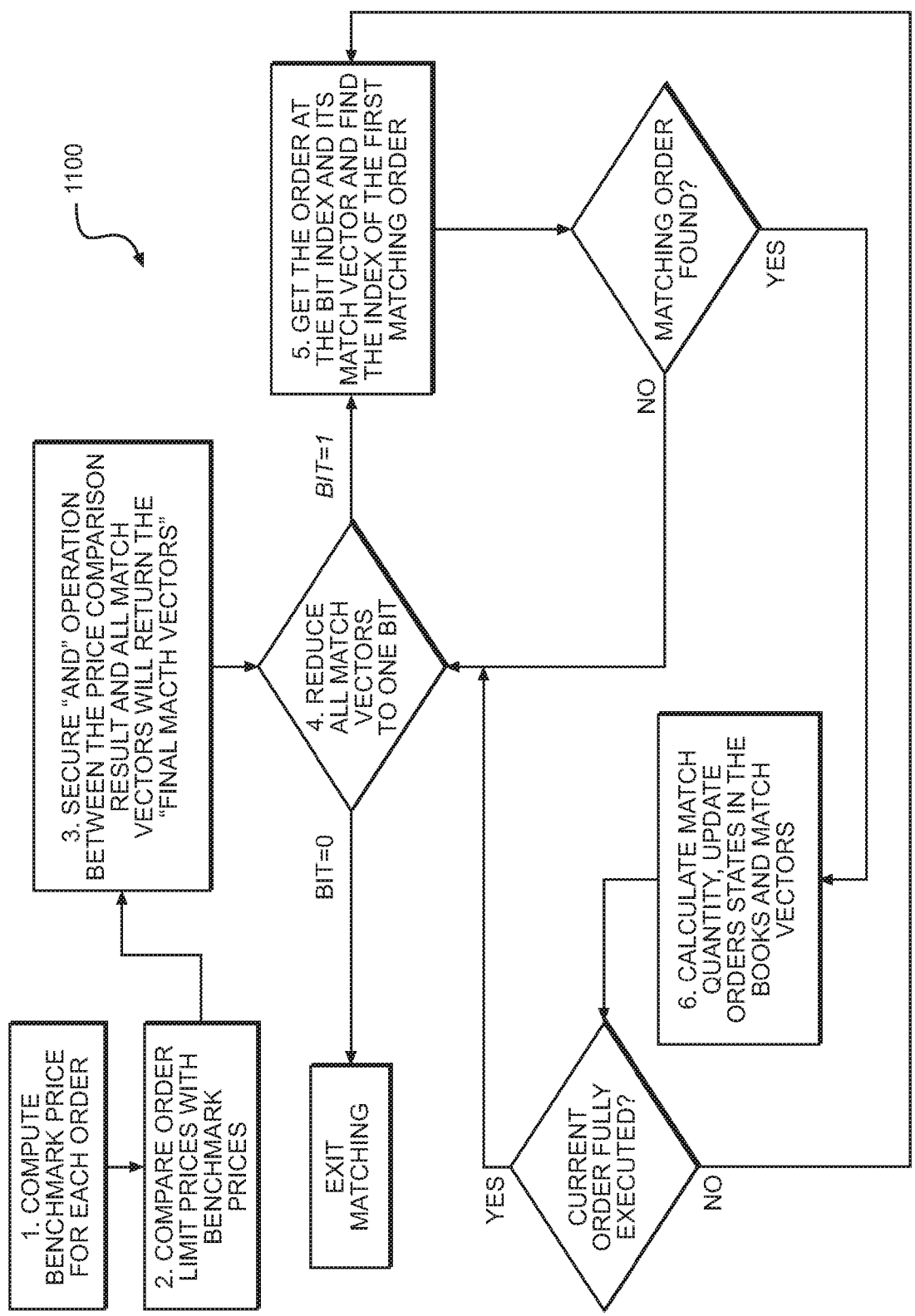
FIG. 11 illustrates an example matching process.

FIG. 11 illustrates an example matching process. In step 1, the benchmark prices for all orders are computed using the subscription definitions and the received market prices. In step 2, after the benchmark prices are present (as a secret share) a price comparison is performed for all prices at once. Note that matching is not continuous and performed at regular (or random intervals) during which a snapshot for all secure market data definitions is published to initiate a round of matching.

In step 3, a secure "and" operation between the price comparison result and all match vectors is executed. The result of this operation, which is a shared secret, will be the final match vectors, showing the positions of all matching orders for the current order, if any. In step 4, a reduction of all match vectors to just one bit which shows if there are matching orders in the order book. If the revealed bit is 1 the AN computes its index and gets the order at the computed index and its match vector and then proceeds to step 5. If the bit is 0 there are no matches in the order book and the AN can return to processing new orders. In step 5, the AN uses a function that returns the first set bit in array the position of the first matching order in the OB is computed.

In step 6, actual matching starts with comparison between the quantities of the current order and its matching order. If they are equal both orders will be fully executed thus removed from the OB and stored to another OB object, referred to as the filled orders. If they are not equal the match quantity is computed by subtracting the bigger quantity from the smaller one. The order with the smaller quantity will be fully executed thus removed from the OB and stored to filled orders. The order with the bigger quantity will be partially executed thus its quantity, min quantity and match vector will be updated. The partially executed orders are also added in the filled orders with quantity equal to the match quantity. If the current order has the bigger quantity the final match vector is computed again with a secure "and" operation on itself and a new quantity comparison of the current order and the entire OB. If the current order is partially executed the AN returns to step 5 to find out if there are more matching orders for the current order. If there is, the AN proceeds to step 6, or otherwise to step 4.

Figure 12:
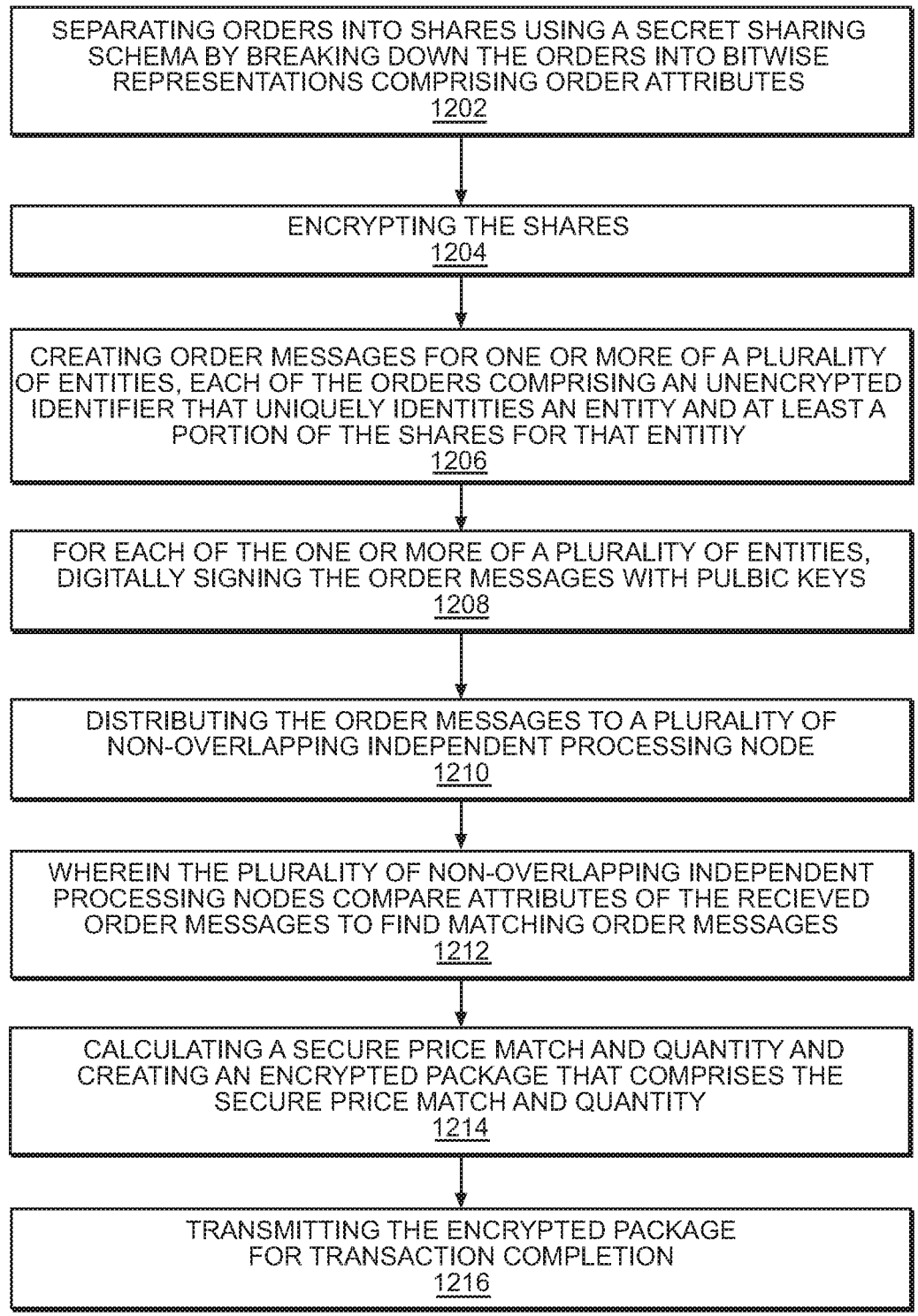
FIG. 12 is a flowchart of an example method of the present disclosure.

FIG. 12 illustrates yet another example method of the present disclosure. The method includes a step 1202 of separating orders into shares using a secret sharing schema by breaking down the orders into bitwise representations comprising order attributes. In some embodiments, the method includes a step 1204 of encrypting the shares, as well as a step 1206 of creating order messages for one or more of a plurality of entities, each of the orders comprising an unencrypted identifier that uniquely identifies an entity and at least a portion of the shares for that entity.

According to some embodiments, the method includes a step 1208 where for each of the one or more of a plurality of entities, digitally signing the order messages with public keys.

Next, the method includes a step 1210 of distributing the order messages to a plurality of non-overlapping independent processing nodes. In some embodiments, the method includes a step 1212 wherein the plurality of non-overlapping independent processing nodes compare attributes of the received order messages to find matching order messages.

In one or more embodiments, the method includes a step 1214 of calculating a secure price match and quantity and creating an encrypted package that comprises the secure price match and quantity, as well as a step 1216 of transmitting the encrypted package for transaction completion.

Some additional approaches to the ones described above are provided below that may be implemented depending on factors such as the number of nodes, network bandwidth and latency between nodes, underlying secret sharing scheme used, and number of instruments in the stock universe.

Some embodiments above implement a secure market data definition that is based on additive sharings of the prices of the data being compared. This is suitable when the field size of the underlying secret scheme was large enough to accommodate the price. However, tests with alternate secret sharing schemes with field sizes of two that assumed all data was bitwise shared by institutional investors or brokers before being sent to the system demonstrated the potential for significant performance gains. Thus the secure market data definition was adapted to accommodate these schemes.

Under the modified definition, rather than additively share the actual price data, brokers and institutional investors would first bitwise share the prices and then create an additive sharing for each bit of each price in the universe rather than each price. This allows the market data definition to be used directly with the alternate secret sharing scheme.

Additionally, an alternate method for performing secure market data comparison based on scalar multiplication and addition of shared secrets was developed. This method is suitable for instrument universes of moderate size.

Under the alternate scheme the institutional investor creates a secure market data definition comprised of an array of secret shared binary values. The array has one position for each instrument in the universe and the value of the array will be set to one for the instrument being specified by the definition and zero for all other instruments.

This definition can be used to generate a secret shared price of the instrument without revealing the instrument. This is accomplished by first doing a multiplication of each element in the array by the public value of the price corresponding to the instrument in the array and then adding up the results of the these operations to get a secret sharing of the price. Since the scalar multiplication and addition can be done locally on each share (i.e. without communication between nodes) this computation can be done very efficiently.

As was the case with the original scheme, if the underlying secret sharing scheme is based on a field of size two, each price can be broken into a binary representation and the array corresponding to the secure market data definition can be multiplied by the public value of each bit of each price and the results added up. The result will be a bitwise-secret sharing of the price.

Another approach to message authentication that also was found to be effective was one that adopted a secret sharing scheme with active security. With active security, the parties can detect that each low level operation has been properly performed by all parties and raise an exception if they haven't.

Under this approach each protocol or secret sharing node only needs to accept instructions from its corresponding application node. In such a scheme if an application node issues a command that is inconsistent with commands issued by other application nodes, the system will either halt waiting for a matching command or raise an exception and alert an administrator.

For example, if node 1 and node 2 issue the command "multiply share A by B and put the result in C" and node 3 issues the command "multiply share A by D and put the result in C." The system would eventually halt waiting for node 3 to issue the proper command.

Alternatively, in the event that node 3 created a share of value A that was inconsistent with the share of value A created by nodes 2 and 3, the active security scheme would detect this and raise an alert.

Figure 13:
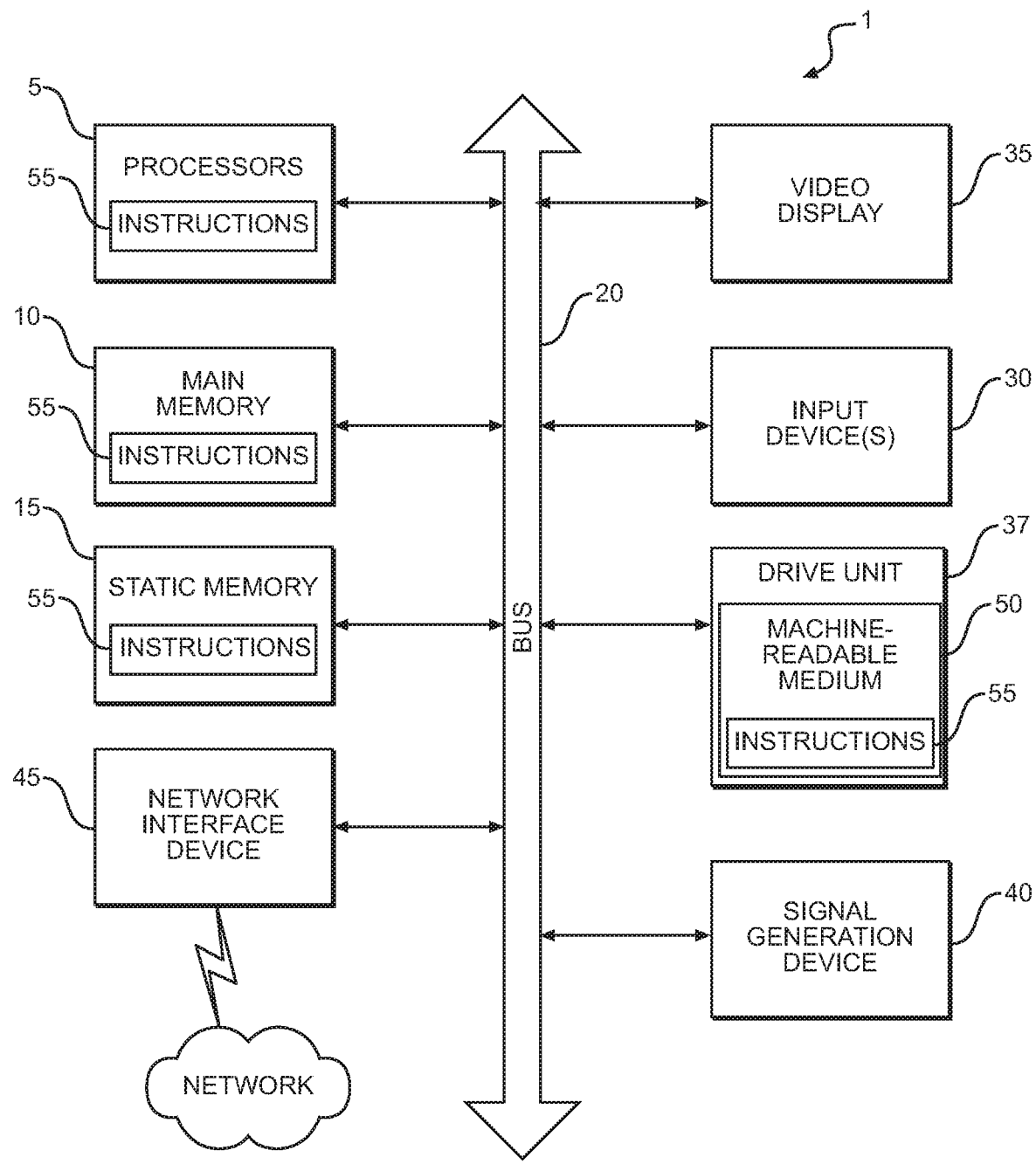
FIG. 13 is a diagrammatic representation of an example machine in the form of a computer system.

FIG. 13 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   separating, by one or more investor systems, orders into shares using a secret sharing schema by breaking down the orders into bitwise representations comprising order attributes;
   encrypting, by the one or more investor systems, the shares;
   creating, by the one or more investor systems, order messages for one or more of a plurality of entities, each of the orders comprising an unencrypted identifier that uniquely identifies an entity and at least a portion of the shares for that entity;
   for each of the one or more of a plurality of entities, digitally signing, by the one or more investor systems, the order messages;
   distributing by, a hardware matching engine, the order messages to a plurality of non-overlapping independent processing nodes;
   wherein the plurality of non-overlapping independent processing nodes perform an operation comprising:
   receive the order messages;
   validate the order messages to prevent unauthorized access to the order messages; and
   compare attributes of the order messages to find matching order messages;
   calculating a secure price match and quantity and creating an encrypted package that comprises the secure price match and quantity; and
   transmitting the encrypted package for transaction completion; wherein the plurality of non-overlapping independent processing nodes compare attributes of the distributed order messages using protocols built on top of low-level operations on the shares, wherein the protocols used for comparison are secure and reveal no information about the orders to any node with visibility of fewer than a threshold number of shares, whether or not that one order matched with another order of the order messages.

2. The method according to claim 1, wherein all share-level operations of the order messages are authenticated by each of the plurality of non-overlapping independent processing nodes to prevent unauthorized access to the order messages.

3. The method according to claim 2, further comprising:
   encrypting the shares using any of a symmetric encryption scheme or a SSL, wherein a public key is used to encrypt a symmetric key; and
   transmitting the symmetric key along with a cipher text of the encrypted shares.

4. The method according to claim 3, wherein the encrypted shares are digitally signed with the public key of an institutional investor and a digital signature is added to the encrypted shares as a message.

5. The method according to claim 4, further comprising:
   validating the digital signature of an order message against the public key of the institutional investor; and
   decrypting the encrypted shares of the order attributes, wherein the decrypted data visible to any given node of the plurality of non-overlaping independent processing nodes provides no information about its corresponding order.

6. The method according to claim 1, wherein each of the plurality of non-overlapping independent processing nodes is operated independently of one another by corporate entities with any of non-overlapping IT infrastructures and overlapping IT infrastructures.

7. The method according to claim 1, wherein the plurality of non-overlapping independent processing nodes communicate with one another over secure point-to-point channels provided by a network.

8. The method according to claim 1, wherein each of the plurality of non-overlapping independent processing nodes comprises share nodes, protocol nodes, and application logic nodes.

9. The method according to claim 8, wherein the share nodes each comprise a share map that stores secret shares for order attributes, intermediate and final results of operations performed on the secret shares, and maintains a mapping between a unique ID and each of the secret shares.

10. The method according to claim 1, further comprising receiving a broker list comprising a list of acceptable brokers.

11. The method according to claim 10, further comprising selecting a broker from the broker list when a match is found based on a comparison of attributes.

12. The method according to claim 1, further comprising finding matching order messages that comprise one order message having a stock identifier and a buy request and a second order message having the same stock identifier and a sell request.

13. The method according to claim 12, wherein the matching is performed in such a way that nodes of the plurality of non-overlapping independent processing nodes below a pre-defined size threshold have no visibility onto the received order messages.

14. A system comprising:
an investor system that creates order messages for one or more of a plurality of entities, each of the order messages comprising an unencrypted identifier that uniquely identifies an entity and at least a portion of order shares for that entity, the order shares comprising bitwise representations comprising order attributes;
the investor system transmitting the order messages to a hardware message bus, the hardware message bus maximizing parallelism and minimizing blocking by making all of the order messages asynchronous and exposing message dependencies and share states to the hardware message bus, the hardware message bus securely processing the order messages by distributing the order messages and processing across multiple segregated non-overlapping independent hardware processing nodes, wherein each segregated non-overlapping independent hardware processing node is configured to:
  receive encrypted order shares in the order messages;
  authenticate the order messages preventing unauthorized access to the order messages;
  compare attributes of the received order messages to find matching order messages;
  calculate a price match and quantity based on the comparison of the attributes and create an encrypted package that comprises the price match and quantity;
  transmit the encrypted package for transaction completion; and wherein the multiple segregated non-overlapping independent hardware processing nodes compare attributes of the distributed order messages using protocols built on top of low-level operations on the order shares, wherein the protocols used for comparison are secure and reveal no information about the orders to any node with visibility of fewer than a threshold number of shares, whether or not that one order matched with another order of the order messages.

15. The system according to claim 14, wherein each of the multiple segregated non-overlapping independent hardware processing nodes comprises an application logic node, a protocol node, and a share node comprising a share map.

16. The system according to claim 15, wherein the share map stores secret shares for the order attributes and intermediate and final results of operations performed on the secret shares and maintains a mapping between the unencrypted identifier that uniquely identifies an entity and at least a portion of the shares for that entity.

17. The system according to claim 16, wherein the unencrypted identifier comprises an Internet Protocol address or a token.

18. The system according to claim 14, wherein when the order messages comprise market data the system further comprises a secure market data feed facilitated by a plurality of secure market data processors that are configured to receive a subscription definition comprising segments corresponding to the plurality of secure market data processors, wherein each segment of the subscription definition is encrypted for processing by the plurality of secure market data processors, wherein the plurality of secure market data processors generates partial subscription results which are combined together by the multiple segreagted non-overlapping independent hardware processing nodes to generate a desired share price used in the price match.

19. A method comprising:
creating, by an investor system, order messages for one or more of a plurality of entities, each of the order messages including market data processed through a secure market data feed by a plurality of secure market data processors, the plurality of secure market data processors configured to receive a subscription definition including segments corresponding to the plurality of secure market data processors, wherein each segment of the subscription definition is encrypted for processing by the plurality of secure market data processors, wherein the plurality of secure market data processors generates partial subscription results which are combined together by a plurality of non-overlapping independent hardware processing nodes to generate a desired share price used in a price match;
and the order messages comprising an unencrypted identifier that uniquely identifies an entity and at least a portion of order shares for the entity, the order shares comprising bitwise representations comprising order attributes;
each of the plurality of non-overlapping independent hardware processing nodes including an application logic node, a protocol node, and a share node comprising a share map; and
storing on the share map secret shares for the order attributes and intermediate and final results of operations performed on the secret shares and maintaining a mapping between the unencrypted identifier that uniquely identifies the entity and at least a portion of the secret shares for the entity;
wherein the plurality of non-overlapping independent hardware processing nodes coupled through a hardware message bus, with each of the plurality of non-overlapping independent hardware processing nodes are further configured to:
  receiving encrypted order shares in the order messages;
  comparing attributes of the received order messages to find matching order messages;

calculating a price match and quantity based on the comparison of the attributes and creating an encrypted package that comprises the price match and quantity;

transmitting the encrypted package for transaction completion, wherein operations performed on the order messages are authenticated by each of the plurality of non-overlapping independent hardware processing nodes to prevent unauthorized access to the order messages and preventing leakage and exposure of the order messages; and wherein the plurality of non-overlapping independent hardware processing nodes compare attributes of the distributed order messages using protocols built on top of low-level operations on the shares, wherein the protocols used for comparison are secure and reveal no information about the orders to any node with visibility of fewer than a threshold number of shares, whether or not that one order matched with another order of the order messages.

* * * * *